(12) United States Patent
Gritti et al.

(10) Patent No.: US 10,468,991 B2
(45) Date of Patent: Nov. 5, 2019

(54) CONTROL METHOD AND DEVICE EMPLOYING PRIMARY SIDE REGULATION IN A QUASI-RESONANT AC/DC FLYBACK CONVERTER

(71) Applicant: STMicroelectronics S.r.l., Agrate Brianza (IT)

(72) Inventors: Giovanni Gritti, Bergamo (IT); Claudio Adragna, Monza (IT)

(73) Assignee: STMICROELECTRONICS S.R.L., Agrate Brianza (IT)

( * ) Notice: Subject to any disclaimer, the term of this patent is extended or adjusted under 35 U.S.C. 154(b) by 0 days.

(21) Appl. No.: 16/155,650

(22) Filed: Oct. 9, 2018

(65) Prior Publication Data

US 2019/0052175 A1 Feb. 14, 2019

Related U.S. Application Data

(63) Continuation of application No. 15/261,340, filed on Sep. 9, 2016, now Pat. No. 10,128,761, which is a
(Continued)

(51) Int. Cl.
*H02M 3/335* (2006.01)
*H02M 1/08* (2006.01)
(Continued)

(52) U.S. Cl.
CPC ......... *H02M 3/33507* (2013.01); *H02M 1/08* (2013.01); *H02M 1/12* (2013.01);
(Continued)

(58) Field of Classification Search
CPC .. H02M 3/33507; H02M 1/08; H02M 1/4241; H05B 33/0845; H05B 33/0815; Y02B 70/126; Y02B 70/1433
(Continued)

(56) References Cited

U.S. PATENT DOCUMENTS 5,729,443 A * 3/1998 Pavlin ................. H02M 3/3381
363/21.12
6,181,120 B1 1/2001 Hawkes et al.
(Continued)

FOREIGN PATENT DOCUMENTS

CN 101527520 A 9/2009
CN 101764528 A 6/2010
(Continued)

OTHER PUBLICATIONS

Adragna,C., "Primary-controlled High-PF Flyback Converters Deliver Constant DC output Current," Proceeding of the 2011—11th European Confrence on Power Electronics and Applications (EPE 2011), Aug. 30-Sep. 1, 2011. pp. 1-10. (Year: 2011).*
(Continued)

*Primary Examiner* — Rajnikant B Patel
(74) *Attorney, Agent, or Firm* — Seed Intellectual Property Law Group LLP

(57) ABSTRACT

The present disclosure is directed to a primary-controlled high power factor quasi resonant converter. The converter converts an AC power line input to a DC output to power a load, generally a string of LEDs, and may be compatible with phase-cut dimmers. The power input is fed into a transformer being controlled by a power switch. The power switch is driven by a controller having a shaping circuit. The shaping circuit uses a current generator, switched resistor and capacitor to produce a reference voltage signal. The controller drives the power switch based on the voltage reference signal, resulting in a sinusoidal input current in a primary winding of the transformer, resulting in high power factor and low total harmonic distortion for the converter.

20 Claims, 22 Drawing Sheets

Related U.S. Application Data continuation of application No. 14/572,627, filed on Dec. 16, 2014, now Pat. No. 9,455,636.

(51) Int. Cl.
   *H02M 1/12* (2006.01)
   *H02M 1/42* (2007.01)
   *H05B 33/08* (2006.01)

(52) U.S. Cl.
   CPC ...... *H02M 1/4241* (2013.01); *H05B 33/0815* (2013.01); *H05B 33/0845* (2013.01); *Y02B 70/126* (2013.01); *Y02B 70/1433* (2013.01)

(58) Field of Classification Search
   USPC ....... 363/21.4, 20, 89, 95, 97; 323/205, 207, 323/222, 282–288, 299
   See application file for complete search history.

(56) References Cited

U.S. PATENT DOCUMENTS

| | | | |
|---|---|---|---|
| 6,300,723 B1 | 10/2001 | Wang et al. | |
| 6,356,466 B1 | 3/2002 | Smidt et al. | |
| 6,853,563 B1 | 2/2005 | Yang et al. | |
| 6,944,034 B1* | 9/2005 | Shteynberg | H02M 1/4258 323/282 |
| 7,425,857 B2 | 9/2008 | Confalonieri et al. | |
| 7,505,287 B1* | 3/2009 | Kesterson | H02M 3/33507 363/21.01 |
| 8,467,209 B2 | 6/2013 | Adragna | |
| 8,513,926 B2 | 8/2013 | Park et al. | |
| 8,520,416 B2 | 8/2013 | Xie et al. | |
| 8,593,841 B2 | 11/2013 | Wang et al. | |
| 8,686,668 B2 | 4/2014 | Grotkowski et al. | |
| 8,810,190 B2* | 8/2014 | Kelley | H02P 6/182 318/729 |
| 9,077,253 B2* | 7/2015 | Adragna | H02M 3/33507 |
| 9,190,835 B2 | 11/2015 | Chen | |
| 9,287,798 B2* | 3/2016 | Stamm | H05B 33/0815 |
| 9,504,111 B2* | 11/2016 | King | H05B 33/0815 |
| 9,520,796 B2 | 12/2016 | Adragna et al. | |
| 10,051,698 B2 | 8/2018 | Gritti | |
| 2004/0095101 A1 | 5/2004 | Pidutti et al. | |
| 2012/0026765 A1 | 2/2012 | Adragna | |
| 2012/0281438 A1 | 11/2012 | Fang et al. | |
| 2013/0070485 A1 | 3/2013 | Li et al. | |
| 2013/0114308 A1 | 5/2013 | Liao et al. | |
| 2013/0154487 A1 | 6/2013 | Kuang et al. | |
| 2013/0162297 A1 | 6/2013 | Gravati et al. | |
| 2015/0055378 A1 | 2/2015 | Lin et al. | |
| 2016/0103158 A1 | 4/2016 | Gravati et al. | |
| 2016/0172981 A1 | 6/2016 | Gritti et al. | |
| 2016/0248323 A1 | 8/2016 | Gritti et al. | |
| 2017/0117814 A1 | 4/2017 | Adragna et al. | |

FOREIGN PATENT DOCUMENTS

| | | |
|---|---|---|
| CN | 102255490 A | 11/2011 |
| CN | 102594135 A | 7/2012 |
| CN | 203661377 U | 6/2014 |
| CN | 203883456 U | 10/2014 |
| EP | 2 753 148 B1 | 9/2015 |

OTHER PUBLICATIONS

Adragna, "Design Equations of High-Power-Factor Flyback Converters Based on the L6561," AN 1059 (Application Note), STMicroelectronics, pp. 1-20, Sep. 2003.

Adragna et al., "Flyback Converters with the L6561 PFC Controller," AN1060 (Application Note), STMicroelectronics, pp. 1-11, Jan. 2003.

Adragna, "Primary-Controlled High-PF Flyback Converters Deliver Constant Dc Output Current," Proceedings of the 2011—14$^{th}$ European Conference on Power Electronics and Applications (EPE 2011), Aug. 30-Sep. 1, 2011, pp. 1-10.

Electric Lamp & Component Manufacturers' Association of India, "Lighting Industry in India Performance Year 2012," retrieved from www.globallightingassociation.org/documents/gla_papers/ELCOMA_presentation_to_GLA_April_24_2013.pdf on Apr. 30, 2018, 27 pages.

Erikson et al., "Design of a Simple High-Power-Factor Rectifier based on the Flyback Converter," Applied Power Electronics Conference and Exposition (APEC '90), Conference Proceedings, pp. 792-801, Mar. 1990.

EU Science Hub, "Energy Efficiency," dated Nov. 14, 2016, retrieved from https://ec.europa.eu/jrc/en/energy-efficiency on Apr. 30, 2018, 2 pages.

Government of India Ministry of Railways, "Functional Requirement Specification for Energy Efficient LED Based Luminaire Unit for Indoor Lights to be Used in Indian Railway Offices and Buildings," retrieved from www.rdso.indianrailways.gov.in/uploads/File/110426_FRS_LED_Indoor_lighting_specifications_EOI(1).pdf on Apr. 30, 2018, 10 pages.

The Climate Group, "India Announces Critical Standards on LED Lighting," retrieved from https://www.theclimategroup.org/what-we-do/news-and-blogs/India-announces-critical-standards-on-LED-lighting on Apr. 30, 2018, 4 pages.

U.S. Department of Energy, Appliance and Equipment Standards Rulemakings and Notices, "External Power Supplies," retrieved from https://www1.eere.energy.gov/buildings/appliance_standards/standards.aspx?productid=1 on Apr. 30, 2018, 6 pages.

Wang et al., "An Improved Control Strategy Based on Multiplier for CRM Flyback PFC to Reduce Line Current Peak Distortion," IEEE Energy Conversion Congress and Exposition (ECCE), Sep. 12-16, 2010, pp. 901-905.

Yan et al., "Variable-On-Time-Controlled Critical-Conduction-Mode Flyback PFC Converter," *IEEE Transactions on Industrial Electronics* 61(11):6091-6099, Nov. 2014.

Zhang et al., "An Optimal Peak Current Mode Control Scheme for Critical Conduction Mode (CRM) Buck PFC Converter," 10th China International Forum on Solid State Lighting (ChinaSSL), Nov. 10-12, 2013, pp. 182-189.

\* cited by examiner

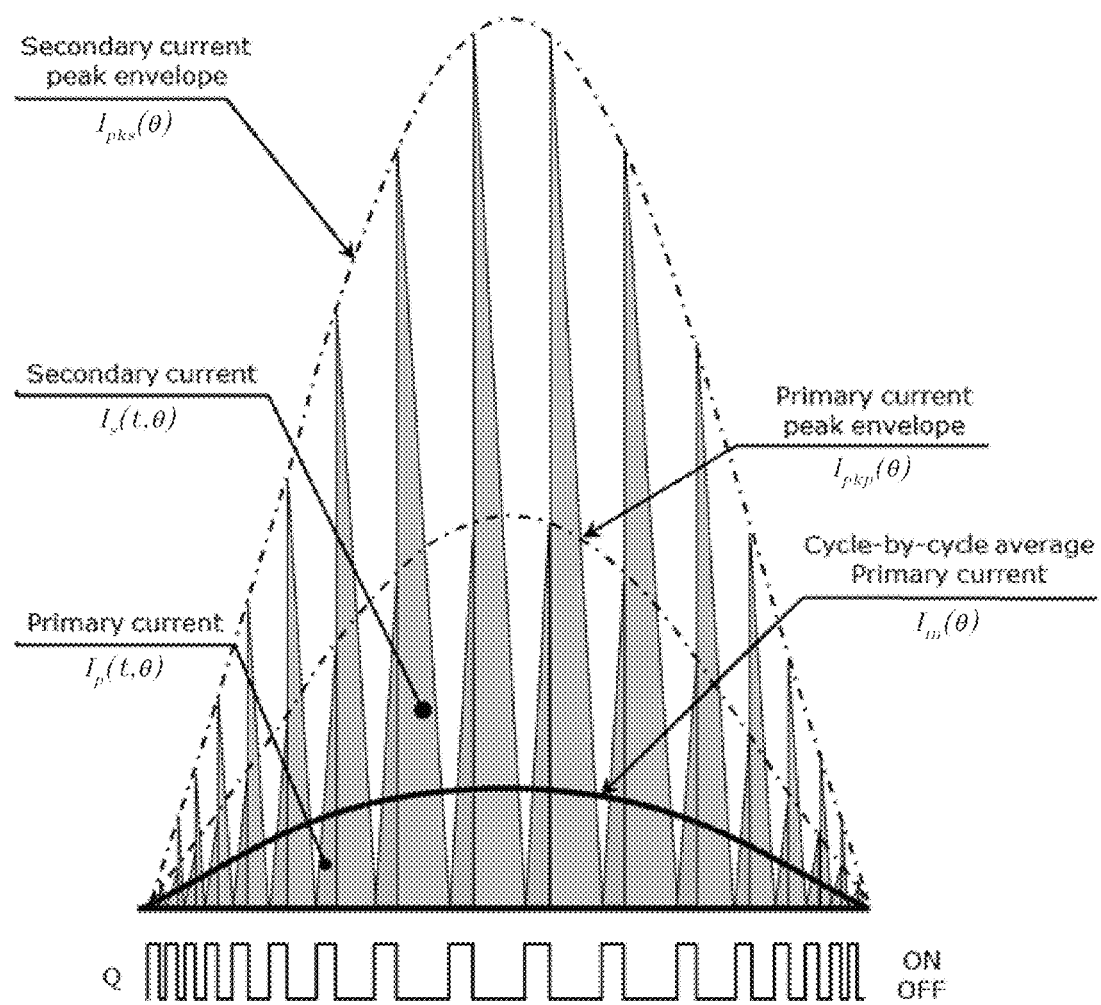
Figure 2 (Prior Art) *(Continued)*

CONTROL METHOD AND DEVICE EMPLOYING PRIMARY SIDE REGULATION IN A QUASI-RESONANT AC/DC FLYBACK CONVERTER

BACKGROUND

Technical Field

The present disclosure relates to converters and, more particularly, to a control device for quasi-resonant AC/DC flyback converters.

Description of the Related Art

Converters, and particularly offline drivers of LED-based lamps for bulb replacement, are often desired to have a power factor greater than 0.9, low total harmonic distortion (THD) and safety isolation. At the same time, for cost reasons, it is desirable to regulate the output DC current required for proper LED driving without closing a feedback loop. In addition, compatibility with dimmers is becoming more and more important for LED drivers, especially dimmers based on phase-cut technology.

High-power-factor (high-PF) flyback converters are able to meet power factor and isolation specifications with a simple and inexpensive power stage. In a high-PF flyback converter there is not an energy reservoir capacitor directly connected to the input rectifier bridge, so that the voltage applied to the power stage is a rectified sinusoid. To achieve high-PF, the input current tracks the input voltage, thus originating a time-dependent input-to-output power flow. As a result, the output current contains a large AC component at twice the main line's frequency.

A quasi-resonant flyback converter has the power switch turn-on synchronized to the instant the transformer demagnetizes (i.e. the secondary current has become zero), normally after an appropriate delay. This allows the turn-on to occur on the valley of the drain voltage ringing that follows the demagnetization, often termed "valley-switching." Most commonly, peak current mode control is used, so the turn-off of the power switch is determined by the current sense signal reaching the value programmed by the control loop that regulates the output voltage or current.

In a flyback converter the input current is the average of the primary current, which flows only during the ON-time of the power switch, resulting in a series of triangles separated by voids corresponding to the OFF-time of the power switch. This "chopping" causes the average value of the primary current to be lower than half the peak value and depend on the mark-space ratio of the triangles. As a result, the input current is no longer proportional to the envelope of the peaks and unlike the envelope, which is sinusoidal, the input current is not sinusoidal. Although a sinusoidal-like shape is maintained, the input current is distorted. This distorted sinusoidal input current results in a flyback converter that fails to achieve low THD or unity power factor.

FIG. 1 shows a high-power-factor (high-PF) flyback converter 30 according to the prior art. The hi-PF flyback converter 30 is powered from an AC power line having voltage $V_{ac}(\theta)$ and includes an input bridge rectifier 34 having inputs 32 that receive the voltage $V_{ac}(\theta)$, a first output connected to ground, and a second output at which the rectifier is configured to produce a rectified sinusoidal voltage $V_{in}(\theta)=V_{PK}|\sin \theta|$ and the current drawn from the power line is sinusoidal-like.

On the primary side, the flyback converter 30 also comprises a capacitor $C_{in}$, which serves as a high-frequency smoothing filter, connected across the output terminals of the bridge rectifier 34, with the negative end connected to ground, and a voltage divider Ra–Rb. The flyback converter 30 has a transformer 36 with a primary winding $L_p$, connected to the positive terminal of the capacitor $C_{in}$, and an auxiliary winding $L_{aux}$ coupled to a resistor $R_{ZCD}$. A power switch M has its drain terminal connected to the primary winding $L_p$ and its source terminal connected to ground via a sense resistor Rs. The current flowing through the power switch M (i.e. the current flowing through the primary winding $L_p$ when M is ON) can be read as a positive voltage drop across the sense resistor Rs. The primary side of the converter also includes a clamp circuit 37 that clamps leakage inductance of the primary winding $L_p$.

On the secondary side, the transformer 36 includes a secondary winding $L_s$, that has one end connected to a secondary ground and the other end connected to the anode of a diode D having a cathode connected to the positive plate of a capacitor $C_{out}$ that has its negative plate connected to the secondary ground.

This flyback converter 30 generates a DC voltage $V_{out}$ at its output terminals across the capacitor $C_{out}$ that will supply a load 40, which is a string of high-brightness LEDs in FIG. 1.

The flyback converter has a divider block 42 having a first input that receives a signal B(θ), and a second input that receives a signal A(θ) that is a portion of the instantaneous rectified line voltage sensed across the capacitor $C_{in}$ and brought to pin MULT through the resistor divider Ra–Rb. The divider ratio Rb/(Ra+Rb) will be denoted with $K_p$.

The capacitor $C_T$ is assumed to be large enough so that the AC component (at twice the line frequency $f_L$) of the signal B(θ) is negligible, at least to a first approximation, with respect to its DC component $B_0$.

The output of the divider block 42 is the division of a rectified sinusoid times a DC level, then still a rectified sinusoid whose amplitude depends on the rms line voltage and the amplitude of the control voltage $B_0$; this will be a reference voltage $Vcs_{REF}(\theta)$ for the peak primary current.

The signal $Vcs_{REF}(\theta)$ is fed to the inverting input of a pulse width modulation comparator 44 that receives at its non-inverting input the voltage Vcs(t, θ), sensed across the sense resistor Rs. The voltage Vcs(t, θ) is proportional to the instantaneous current $I_p(t, \theta)$ flowing through the primary winding $L_p$ and the power switch M when the switch M is ON. Assuming the power switch M is initially ON, the current through the primary winding $L_p$ will be ramping up and so will the voltage across the sense resistor Rs. When Vcs(t,θ) equals $Vcs_{REF}(\theta)$, the PWM comparator 44 resets the SR flip-flop 46 which switches off the power switch M. Therefore, the output of the divider 42, shaped as a rectified sinusoid, determines the peak value of the current of the primary winding $L_p$. As a result, the peak value of the primary winding current will be enveloped by a rectified sinusoid.

After the power switch M has been switched off, the energy stored in the primary winding $L_p$ is transferred by magnetic coupling to the secondary winding $L_s$ and then dumped into the output capacitor $C_{out}$ and the load 40 until the secondary winding $L_s$ is completely demagnetized. When the secondary winding $L_s$ is demagnetized, the diode D opens and the drain node becomes floating, which was fixed at $V_{in}(\theta)+V_R$ while the secondary winding $L_s$ and the diode D were conducting, with $V_R$ being the reflected voltage seen across the primary winding. The voltage at the drain node would tend to eventually reach the instantaneous line voltage $V_{in}(\theta)$ through a damped ringing due to its parasitic capacitance that starts resonating with the primary winding $L_p$. The quick drain voltage fall that follows the demagnetization of the transformer 36 is coupled to the pin ZCD of the controller through the auxiliary winding $L_{aux}$ and the resistor $R_{ZCD}$. A zero crossing detector (ZCD) block 48 releases a pulse every time it detects a falling edge going below a threshold and this pulse sets the SR flip flop 46 and drives ON the power switch M, starting a new switching cycle.

An OR gate 50 between the ZCD block 48 and the set input of the SR flip flop 46 allows the output of a STARTER block 52 to initiate a switching cycle. The STARTER block outputs a signal at power-on when no signal is available on the input of the ZCD block 48 and prevents the converter from getting stuck in case the signal on the input of the ZCD block 48 is lost for any reason.

The ZCD block 48 also generates a FW signal that is high during transformer's demagnetization, as shown in FIG. 2, and is used by the control loop 56 to generate the $B(\theta)$ signal.

Assuming $\theta \in (\theta, \pi)$, according to the control scheme under consideration the peak envelope of the primary current is given by:

$$I_{pkp}(\theta) = I_p(T_{ON}, \theta) = I_{PKp} \sin \theta \qquad (1)$$

It is worth noticing that this scheme results in a constant ON-time $T_{ON}$ of the power switch M:

$$T_{ON} = L_p \frac{I_{PKp} \sin \theta}{V_{PK} \sin \theta} = L_p \frac{I_{PKp}}{V_{PK}}$$

For simplicity, the OFF-time $T_{OFF}(\theta)$ of the power switch M will be considered coincident with the time $T_{FW}(\theta)$ during which current circulates on the secondary side. In other words, the time interval $T_R$ during which the voltage across the power switch M rings (starting just after $T_{FW}(\theta)$, as the current in the secondary winding $L_s$ has gone to zero), until reaching the valley of the ringing will be neglected. This is acceptable as long as $T_R \ll T_{OFF}(\theta)$.

The switching period $T(\theta)$ is therefore given by:

$$T(\theta) = T_{ON} + T_{FW}(\theta)$$

Considering volt-second balance across the primary winding $L_p$ it is possible to write:

$$T_{FW}(\theta) = T_{ON} \frac{V_{PK} \sin \theta}{V_R}$$

where $V_R$ is the reflected voltage, i.e. the output voltage $V_{out}$ times the primary-to-secondary turns ratio $n = N_p/N_s$, seen across the primary winding $L_p$ of the transformer 36 in the time interval $T_{FW}(\theta)$:

$$V_R = (V_{out} + V_F)$$

where $V_F$ is the forward drop on the secondary diode D. Therefore:

$$T(\theta) = T_{ON}(1 + K_v \sin \theta)$$

with $K_v = V_{PK}/V_R$.

The input current $I_{in}$ to the converter 30 is found by averaging the current $I_p(t, \theta)$ in the primary winding $L_p$ over a switching cycle. The current $I_p(t, \theta)$ is the series of gray triangles in the right-hand side of FIG. 2 so it is found that:

$$I_{in}(\theta) = \frac{1}{2} I_{pkp}(\theta) \frac{T_{ON}}{T(\theta)} = \frac{1}{2} I_{PKp} \frac{\sin \theta}{1 + K_v \sin \theta}$$

This equation shows that the input current $I_{in}$ is not a pure sinusoid: this current is sinusoidal only for $K_v = 0$; when $K_v \neq 0$, although a sinusoidal-like shape is maintained, the input current is distorted, the higher $K_v$ the higher the distortion. Since $K_v$ cannot be zero (which would require the reflected voltage to tend to infinity), the prior art QR control scheme does not permit zero Total Harmonic Distortion (THD) of the input current nor unity power factor in a flyback converter even in the ideal case.

FIG. 3 shows the plots of the THD of the input current and of the power factor versus $K_v$.

The regulated DC output current value obtained with this control method is:

$$I_{out} = \frac{n}{2} \frac{K_D}{R_S G_M} \frac{1}{R_T}$$

where $K_D$ is the gain of the divider block 42 and $G_M$ the transconductance of a current generator 54 which produces current $IC_H(\theta)$.

This equation shows that with the control method of FIG. 1, which uses only quantities available on its primary side, the DC output current $I_{out}$ depends only on external, user-selectable parameters (n, Rs) and on internally fixed parameters ($G_M$, $R_T$, $K_D$) and does not depend on the output voltage $V_{out}$, nor on the rms input voltage $V_{in}$ or the switching frequency $f_{sw}(\theta) = 1/T(\theta)$.

This control method makes the flyback converter 30 work as a current source. Therefore, even with a chopped AC input voltage—which happens in case the converter is operated through a phase-cut wall dimmer (e.g. leading and trailing edge dimmer as shown in FIG. 5)—the converter forces the preset DC output current to the load.

In that case, however it would be desirable to reduce the regulation setpoint depending on the dimmer firing angle (1−α) to be compatible with a dimmer: the higher α is, the lower the current set-point should be. This can be realized by modifying the circuit 56 in FIG. 1 as shown in FIG. 4. The sensed input voltage is compared to a threshold voltage $V_{th}$ in a dimmer comparator 60 and, if it stays below the threshold for a time longer than $T_{ML}$, it is assumed that the line voltage is missing (because the dimmer is open) and an EN signal goes low. This freezes the state of the power switch M and disconnects both the current generator 54 producing current $I_{CH}(\theta)$ and the discharge resistor $R_T$. In this way the voltage across $C_T$ is frozen at the value in the instant when the input voltage goes to zero.

The delay $T_{ML}$ prevents the circuit from being improperly activated near the zero-crossings of the line voltage when this is not chopped. Note also that this delay is unidirectional: as the sensed voltage exceeds the threshold voltage $V_{th}$ the enable signal EN goes high immediately.

The net effect of stopping the charge/discharge activity of the capacitor $C_T$ can be regarded as an average increase of the discharge resistor $R_T$, leading to a reduction of the preset output current $I_{out}$ inversely proportion to the firing angle of the dimmer:

$$I_{out} = \frac{n}{2} \frac{K_D}{RsG_M R_T}(1-\alpha).$$

Real world dimmers have typically a fire angle between 10-20% and 80-90%, and therefore if using the control scheme shown in FIG. 4, the minimum/maximum output current setpoint could be in the range of 10-20% and 80-90% respectively. In other words the control method shown in FIG. 4 cannot meet the typical desired characteristic of a dimmer shown in FIG. 6.

BRIEF SUMMARY

One embodiment of the present disclosure is a quasi-resonant flyback converter having a sinusoidal input current in order to achieve low total harmonic distortion and high power factor.

One embodiment of the present disclosure is directed to a control mechanism that enables high power factor (Hi-PF) quasi-resonant (QR) flyback converters with peak current mode control using only quantities available on its primary side able to ideally draw a sinusoidal current from the input source and with an with optimized compatibility to the phase-cut wall dimmers.

One embodiment of the present invention is a device for controlling a power transistor of a power stage. The device includes a divider having a first input, a second input and an output, the divider being configured to produce a voltage reference signal. A first current generator configured to produce an output current. A shaper circuit configured to output to the first input of the divider a first signal based on the output current of the first current generator. A bias circuit coupled to the first current generator and configured to output a second signal to the second input of the divider; and a driver circuit having a first input configured to receive the reference signal, and an output configured to drive the power transistor.

DETAILED DESCRIPTION

Figure 7:
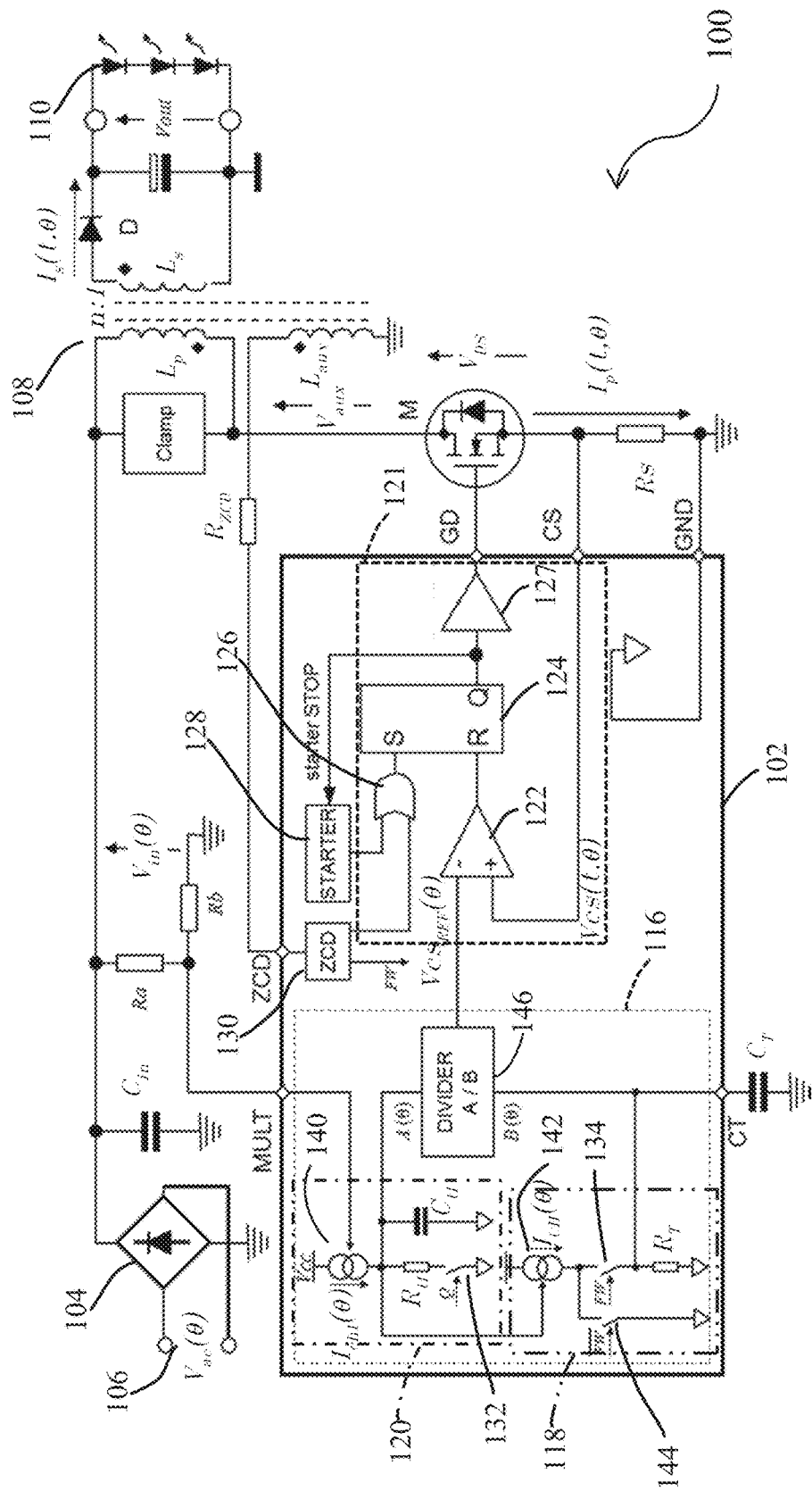
FIG. 7 shows the principle schematic of a primary-controlled Hi-PF QR flyback converter according to one embodiment the present disclosure.

FIG. 7 shows a hi-PF QR flyback converter 100 according to one embodiment of the present disclosure. On the primary side, the QR flyback converter 100 includes a controller 102, a bridge rectifier 104 having inputs 106 coupled to an AC power line that supplies an AC voltage $V_{ac}$, an input capacitor $C_{in}$, a voltage divider $R_a$-$R_b$ coupled to the bridge rectifier 104, a primary winding $L_p$ and an auxiliary winding $L_{aux}$ of a transformer 108, power switch M coupled to the transformer 108 and controlled by controller 102, sensing resistor $R_s$ coupled to the power switch M and controller 102, a resistor $R_{ZCD}$ coupled to the auxiliary winding $L_{aux}$, and a clamp circuit 109 connected across the primary winding $L_p$.

On the secondary side of the converter 100, a secondary winding $L_s$ of the transformer 108 has one end connected to a secondary ground and the other end connected to the anode of a diode D having the cathode connected to the positive plate of a capacitor $C_{out}$ that has its negative plate connected to the secondary ground. The converter 100 provides an output voltage $V_{out}$ that supplies power to a load 110, which in FIG. 7 is a set of LEDs, although other loads could be supplied by the converter 100.

The controller 102 has a reference voltage circuit 116 that is configured to produce a reference voltage $V_{CSREF}$ and includes a bias circuit 118 and a shaper circuit 120. The controller 102 also includes a driver circuit 121 having a PWM comparator 122, an SR flip-flop 124, an OR gate 126, and a driver 127 configured to drive the power switch M. The PWM comparator 122 includes an inverting input that receives the reference voltage $V_{CSREF}$, a non-inverting input that receives a sense voltage $V_{CS}$ from the sense resistor $R_s$, and an output that provide a reset signal to a reset input R of the flip-flop 124. The flip-flop 124 also includes a set input S, coupled to an output of the OR gate 126, and an output that is coupled to an input of the driver 127. The OR gate 126 also has first and second inputs coupled to respective outputs of a starter block 128 and a ZCD block 130. The OR gate 126 provides a set signal to the set input S of the SR flip flop when the ZCD block 130 detects a falling edge go below a threshold, or when the starter block 128 produces a start signal as discussed above.

The reference voltage circuit 116 has a bias circuit 118 and a shaper circuit 120. The shaper circuit 120 has a first current generator 140, a resistor $R_{t1}$ coupled to an output of the first current generator 140, a switch 132 that switchably couples the resistor $R_{t1}$ to ground, and a capacitor $C_{t1}$ coupled between the output of the current generator 140 and ground. The first current generator 140 has an input coupled to a supply terminal Vcc and a control terminal coupled to the voltage divider $R_a$–$R_b$ via the pin MULT and produces a current $I_{CH1}(\theta)$. The switch 132 is controlled by the output Q of the flip-flop 124 and thereby connects the capacitor $C_{t1}$ in parallel with the switched resistor $R_{t1}$ when the power switch M is ON.

The bias circuit 118 includes a second current generator 142 having an input coupled to the supply terminal Vcc, a control terminal coupled to the output of the first current generator 140, and an output at which the second current generator produces a current $I_{CH}(\theta)$. A second switched resistor $R_t$ is switchably coupled to the output of the second current generator 142 by a switch 134 configured to connect the resistor $R_t$ to the second current generator 142 under the control of the signal FW provided by the ZCD block 130. The signal FW is high when the current is flowing in the secondary winding $L_s$. Another switch 144 is coupled to the output of the second current generator 142 and is configured to connect the output of the second current generator 142 to ground when the ZCD block 130 under control of a signal $\overline{FW}$ that is an inverted version of the signal FW.

The reference voltage circuit 116 also includes a divider block 146 having a first input that receives a signal $A(\theta)$ from the shaper circuit 120, a second input that receives a signal $B(\theta)$ from the bias circuit 118, and an output at which the divider provides the reference voltage $V_{CSREF}$.

The signal $A(\theta)$ is generated by the first current generator 140 acting on the switched resistor $R_{t1}$ and capacitor $C_{t1}$. The current $I_{CH1}(\theta)$ produced by the current generator 140 is proportional to a rectified input voltage $V_{in}$ produced at the voltage divider $R_a$–$R_b$.

The resistor $R_{t1}$ is connected in parallel to the capacitor $C_{t1}$ by the switch 132 when the signal Q of the SR flip flop 124 is high, i.e. during the on-time of the power switch M, and is disconnected when Q is low, i.e. during the off-time of the power switch M. The voltage developed across the capacitor $C_{t1}$ is $A(\theta)$ and is fed to the first input of the divider block 146.

The current $I_{ch1}(\theta)$ provided by the current generator 140 can be expressed as:

$$I_{ch1}(\theta) = g_{m1} K_P (V_{PK} \sin \theta)$$

where $g_{m1}$ is the current-to-voltage gain of the first current generator 140.

An assumption is that $T(\theta) \ll R_{t1} C_{t1} \ll 1/f_L$. In this way, the switching frequency ripple across the capacitor $C_{t1}$ is negligible and $I_{ch1}(\theta)$ can be considered constant within each switching cycle.

The $A(\theta)$ voltage developed across $C_{t1}$ by charge balance is:

$$A(\theta) = R_{t1} \, I_{ch1}(\theta) \frac{T(\theta)}{T_{ON}(\theta)} = R_{t1} g_{m1} \, K_P \, (V_{PK} \sin \theta) \frac{T(\theta)}{T_{ON}(\theta)}$$

Figure 1:
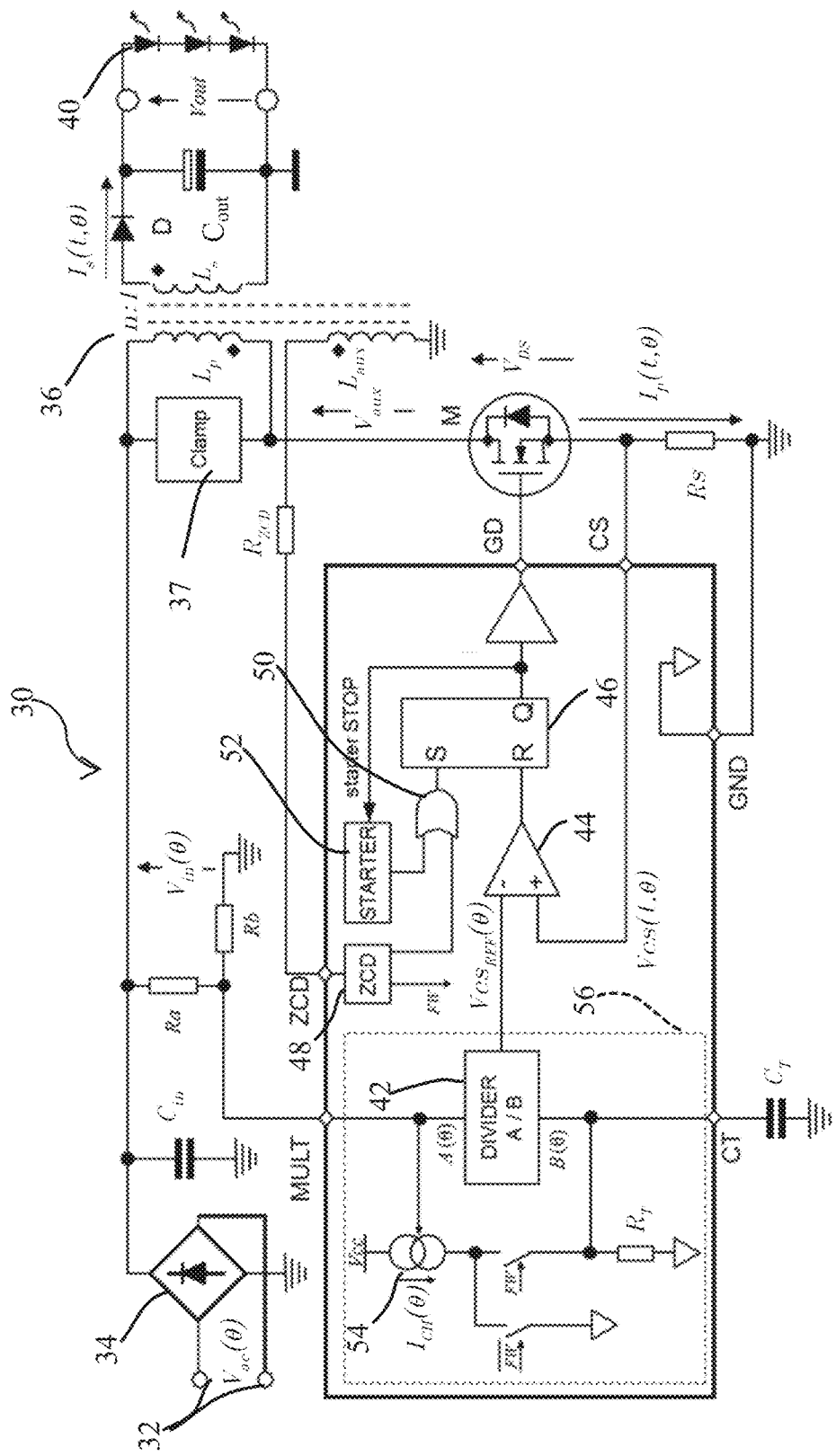
FIG. 1 shows a schematic of a primary-controlled Hi-PF QR flyback converter according to the prior art.

The generation of the other input signal $B(\theta)$ to the divider block 146 is similar to that of the $B(\theta)$ of FIG. 1. The current $I_{CH}(\theta)$ provided by the second current generator 142 and used to generate the $B(\theta)$ signal, can be expressed as:

$$I_{CH}(\theta) = G_M A(\theta)$$

where $G_M$ is the current-to-voltage gain of the second current generator 142.

Now considering the $C_T$ by charge balance, it is possible to find the voltage $B(\theta)$ developed across the capacitor $C_T$:

$$B(\theta) = G_M \, R_T \, g_{m1} \, R_{t1} \, K_P (V_{PK} \sin \theta) \frac{T_{FW}(\theta)}{T_{ON}(\theta)}$$

The capacitor $C_T$ is assumed to be large enough so that the AC component (at twice the line frequency $f_L$) of the signal $B(\theta)$ is negligible with respect to its DC component $B_0$, which can be written as:

$$B_0 = \overline{B(\theta)} =$$

$$\frac{1}{\pi} G_M \, R_T \, g_{m1} \, R_{t1} \, K_P \, V_{PK} \int_0^\pi \sin \theta \frac{T_{FW}(\theta)}{T_{ON}(\theta)} d\theta = \frac{G_M R_T g_{m1} R_{t1} K_P V_{PK} K_V}{2}$$

Considering the voltage-second balance for transformer 108, the primary on time $T_{ON}(\theta)$ and secondary on time $T_{FW}(\theta)$ can be expressed by the following relationship:

$$\frac{T_{FW}(\theta)}{T_{ON}(\theta)} = K_v \sin \theta$$

The voltage reference $Vcs_{REF}(\theta)$ is therefore:

$$Vcs_{REF}(\theta) = K_D \frac{A(\theta)}{B(\theta)} \approx K_D \frac{A(\theta)}{B_0} = K_D \frac{2}{G_M \, R_T \, K_v} \sin \theta \frac{T(\theta)}{T_{ON}(\theta)}$$

where $K_D$ is the gain of the divider block 146 and it is dimensionally a voltage. Considering that the peak primary current $I_{pkp}(\theta)$ can be expressed as:

$$I_{pkp}(\theta) = \frac{Vcs_{REF}(\theta)}{R_S}$$

The input current can be expressed as:

$$I_{IN}(\theta) = \frac{1}{2} I_{PKP}(\theta) \frac{T_{ON}(\theta)}{T(\theta)}$$

$$I_{IN}(\theta) = \frac{K_D}{G_M R_T K_V} \sin \theta \frac{1}{R_S}$$

This results in a sinusoidal input current in a constant-current primary-controlled Hi-PF QR flyback converter 100.

Considering that the secondary current is n=Np/Ns times the primary current, the peak secondary current $I_{pks}(\theta)$ can be calculated as:

$$I_{pks}(\theta) = n \, K_D \frac{2}{G_M \, R_T \, K_v} \sin \theta \frac{T(\theta)}{T_{ON}(\theta)} \frac{1}{R_S}.$$

Figure 8:
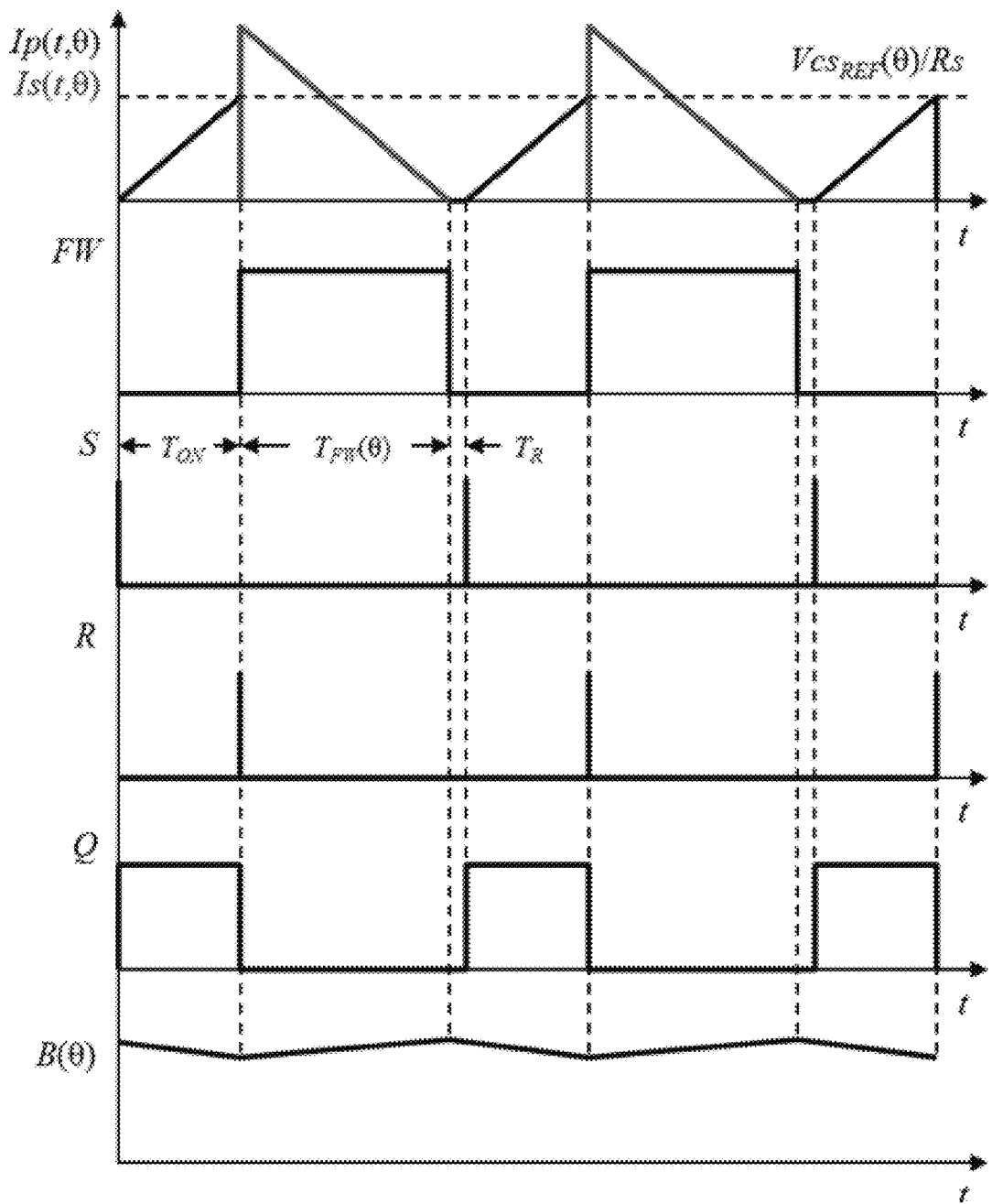
FIG. 8 shows the key waveforms of the circuit in FIG. 7 during normal operation.
Figure 8:
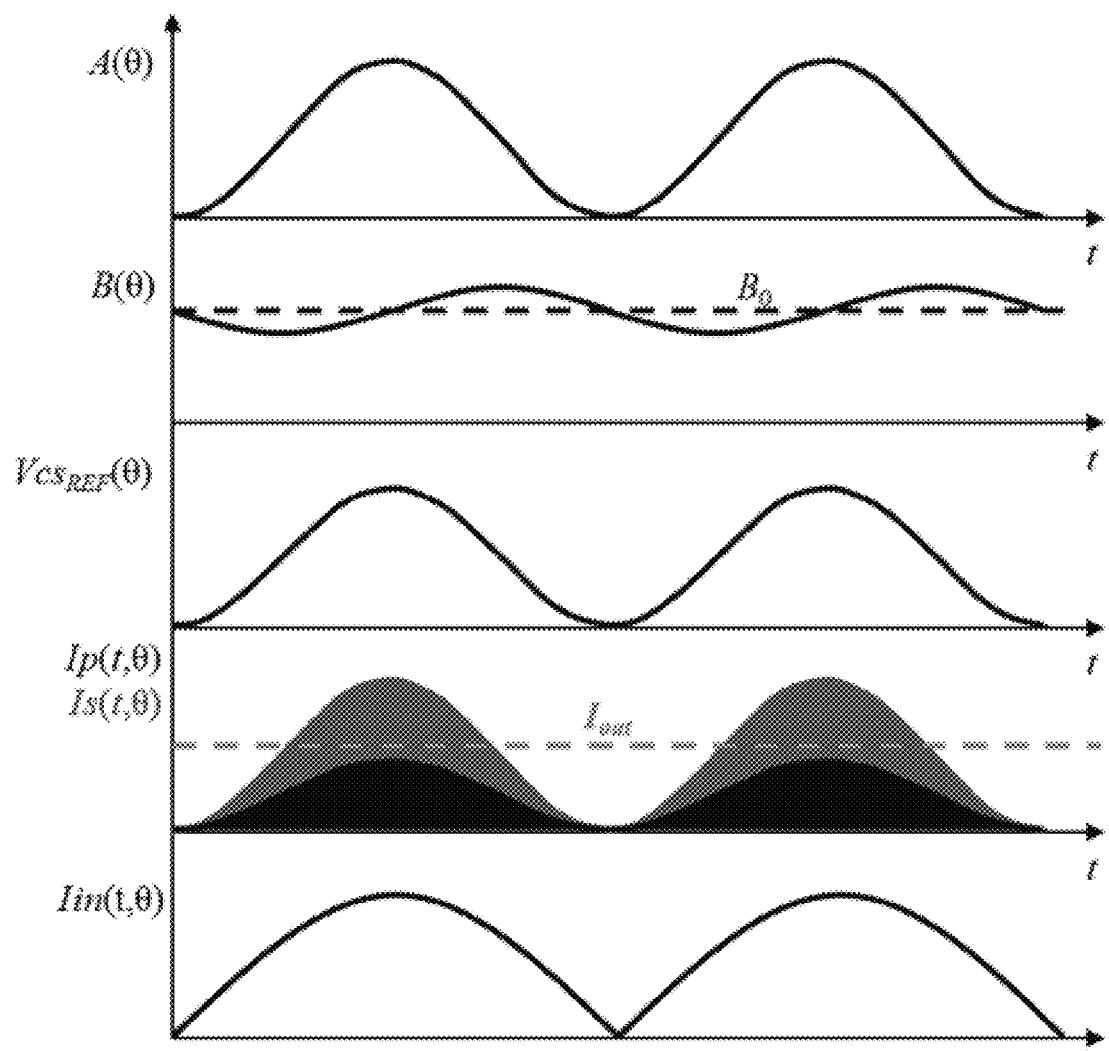

Since the cycle-by-cycle secondary current Is(t,θ) is the series of triangles shown in left-hand side of FIG. 8, its average value in a switching cycle is:

$$I_o(\theta) = \frac{1}{2} I_{pks}(\theta) \frac{T_{FW}(\theta)}{T(\theta)} = \frac{n}{G_M} \frac{K_D}{R_T K_v} \sin\theta \frac{T_{FW}(\theta)}{T_{ON}(\theta)} \frac{1}{R_S}.$$

The DC output current $I_{out}$ is the average of $I_o(\theta)$ over a line half-cycle:

$$I_{out} = \overline{I_o(\theta)} = \frac{1}{\pi} \int_0^\pi \frac{n K_D}{G_M R_T K_V R_S} \sin\theta \frac{T_{FW}(\theta)}{T_{ON}(\theta)} d\theta.$$

Finally, the average output current is:

$$I_{out} = \frac{n K_D}{2 G_M R_T R_S}.$$

The previous expression shows that the circuit of FIG. 7 has a DC output current Iout that depends only on external, user-selectable parameters (n, Rs) and on internally fixed parameters ($G_M$, $R_T$, $K_D$) and does not depend on the output voltage Vout, nor on the RMS input voltage Vin or the switching frequency $f_{SW}(\theta)=1/T(\theta)$.

Therefore, it is possible to conclude that the converter 100 of FIG. 7, in addition to providing ideally unity power factor and zero harmonic distortion of the input current, also provides a regulated Iout using only quantities available on the primary side.

Figure 12:
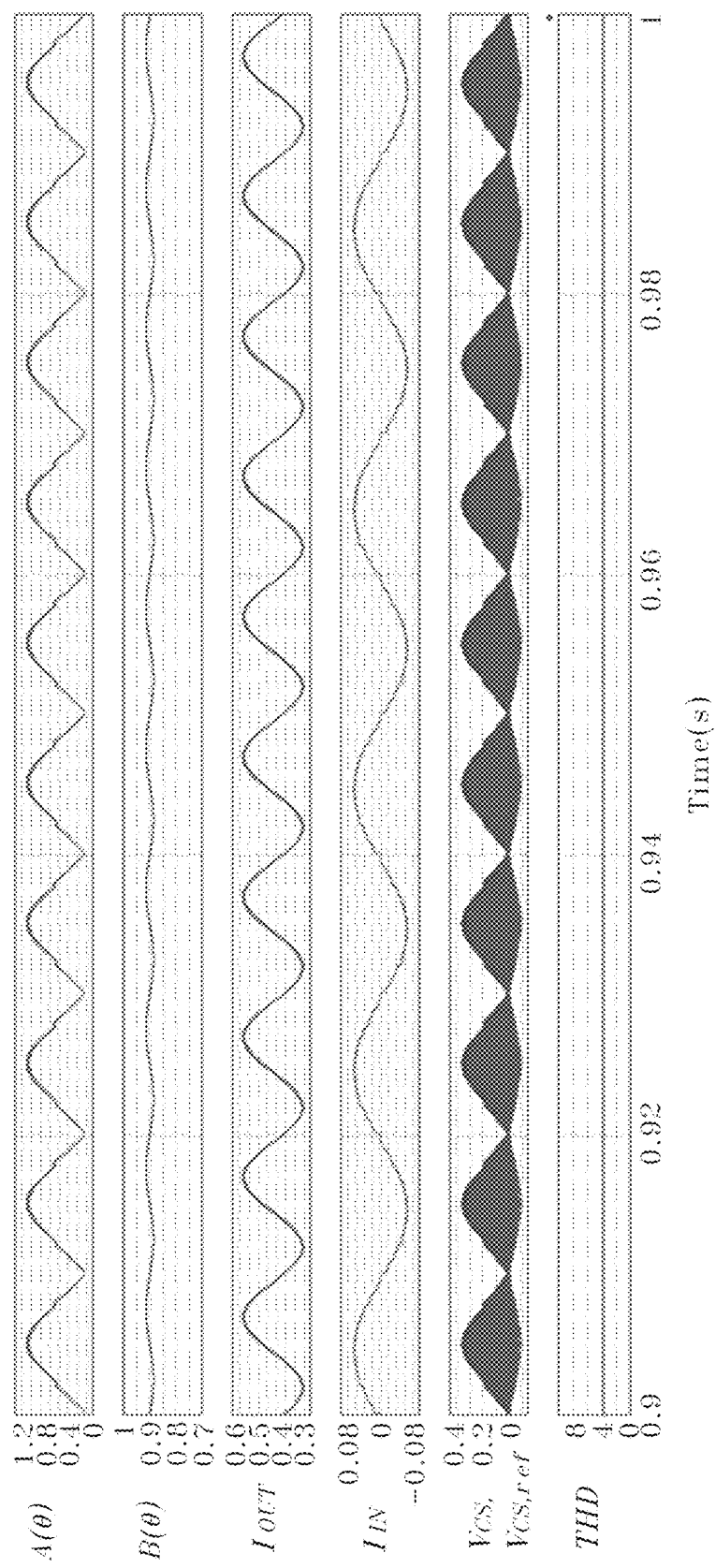
FIG. 12 shows the simulation results for the circuit in FIG. 7 at 265 Vac.
Figure 13:
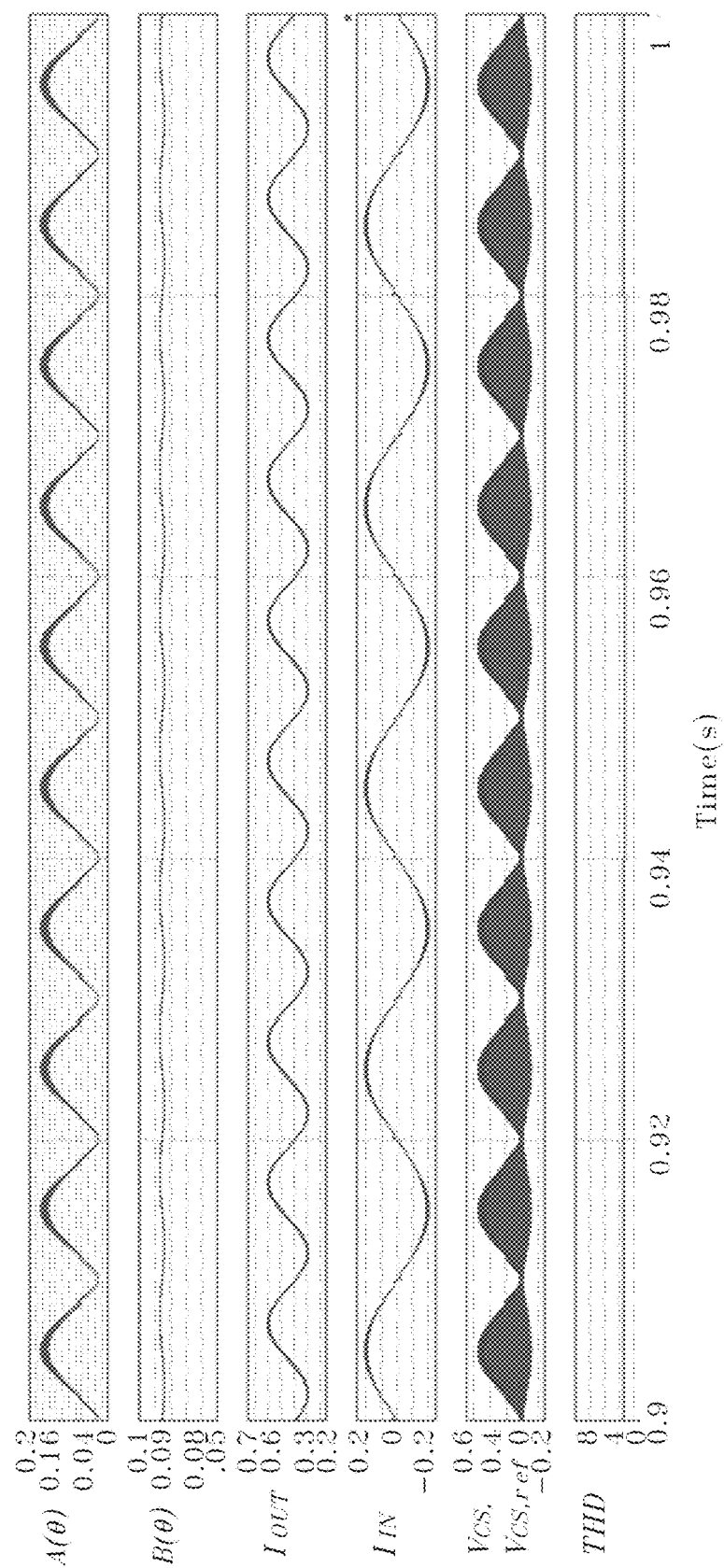
FIG. 13 shows the simulation results for the circuit in FIG. 7 at 90 Vac.

FIGS. 12 and 13 show simulation results of the signals of FIG. 7 with Vin being 265 VAC and 90 VAC respectively, including $A(\theta)$, $B(\theta)$, Iout, Iin, $V_{CSREF}$, and the THD of the circuit. It is worth noticing the very low distortion level of the input current (around 3.3% at $V_{in}=90$ Vac, around 3.8% at $V_{in}=265$ Vac), due to the input EMI filter and the non-idealities considered both in the controller 102 and the bridge rectifier 104, transformer 108 and power switch M.

FIG. 8 illustrates several of the waveforms of converter 100 of FIG. 7. On the left-hand side are the waveforms on a switching period time scale, on the right-hand side the waveforms on a line cycle time scale.

Figure 14:
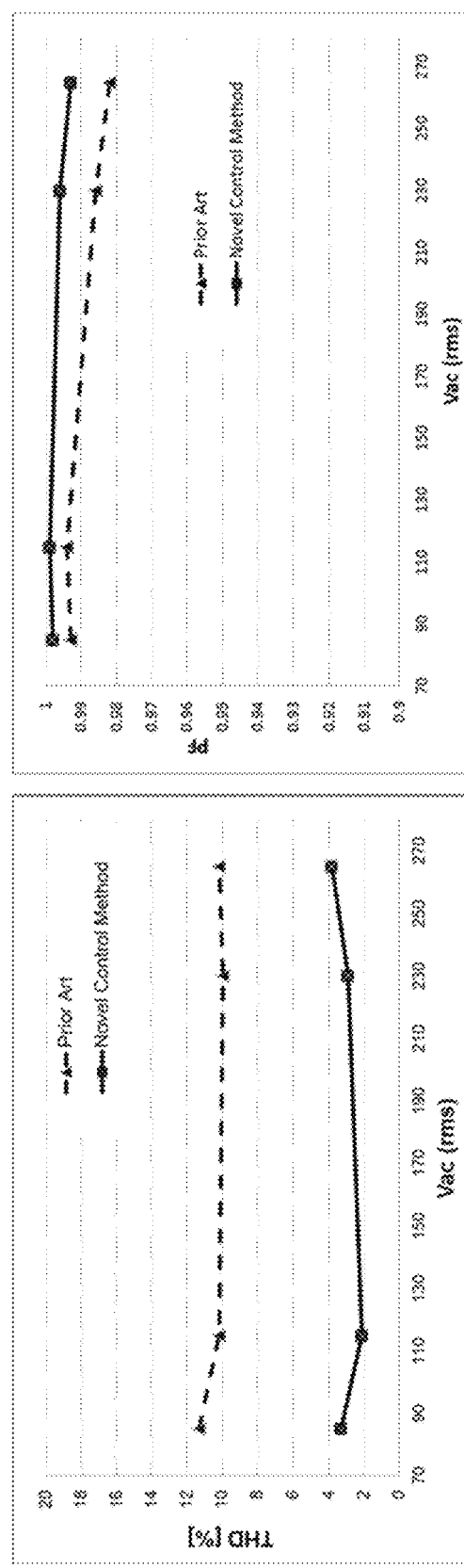
FIG. 14 shows the simulation results comparison between the prior art method and the present disclosure according to one embodiment.
Figure 15:
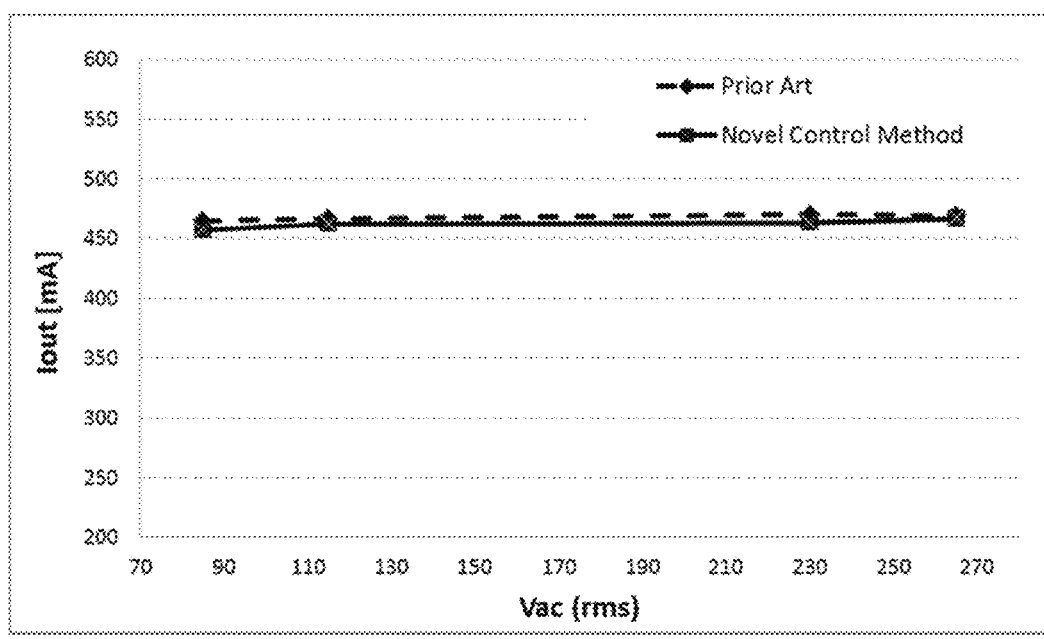
FIG. 15 shows the simulation results comparison between the prior art method and the present disclosure for $I_{out}$ output current.

In FIG. 14 are shown the simulation results comparison between the prior art converter 30 and the presently disclosed converter 100 in terms of THD (left) and PF (right). FIG. 15 shows the simulation results comparison in terms of output current regulation.

Figure 6:
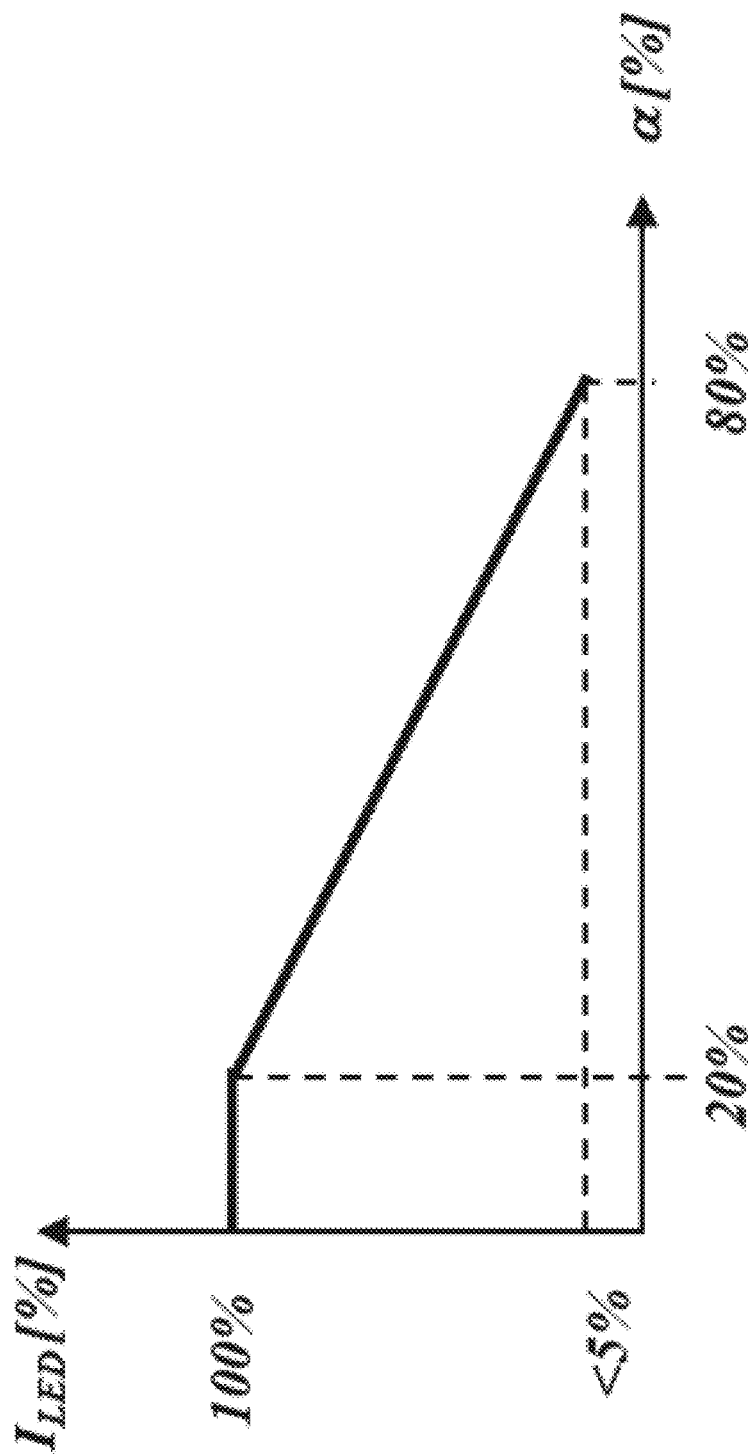
FIG. 6 shows the typical desired output LED current characteristic when using dimmer based on phase-cut technology.
Figure 9:
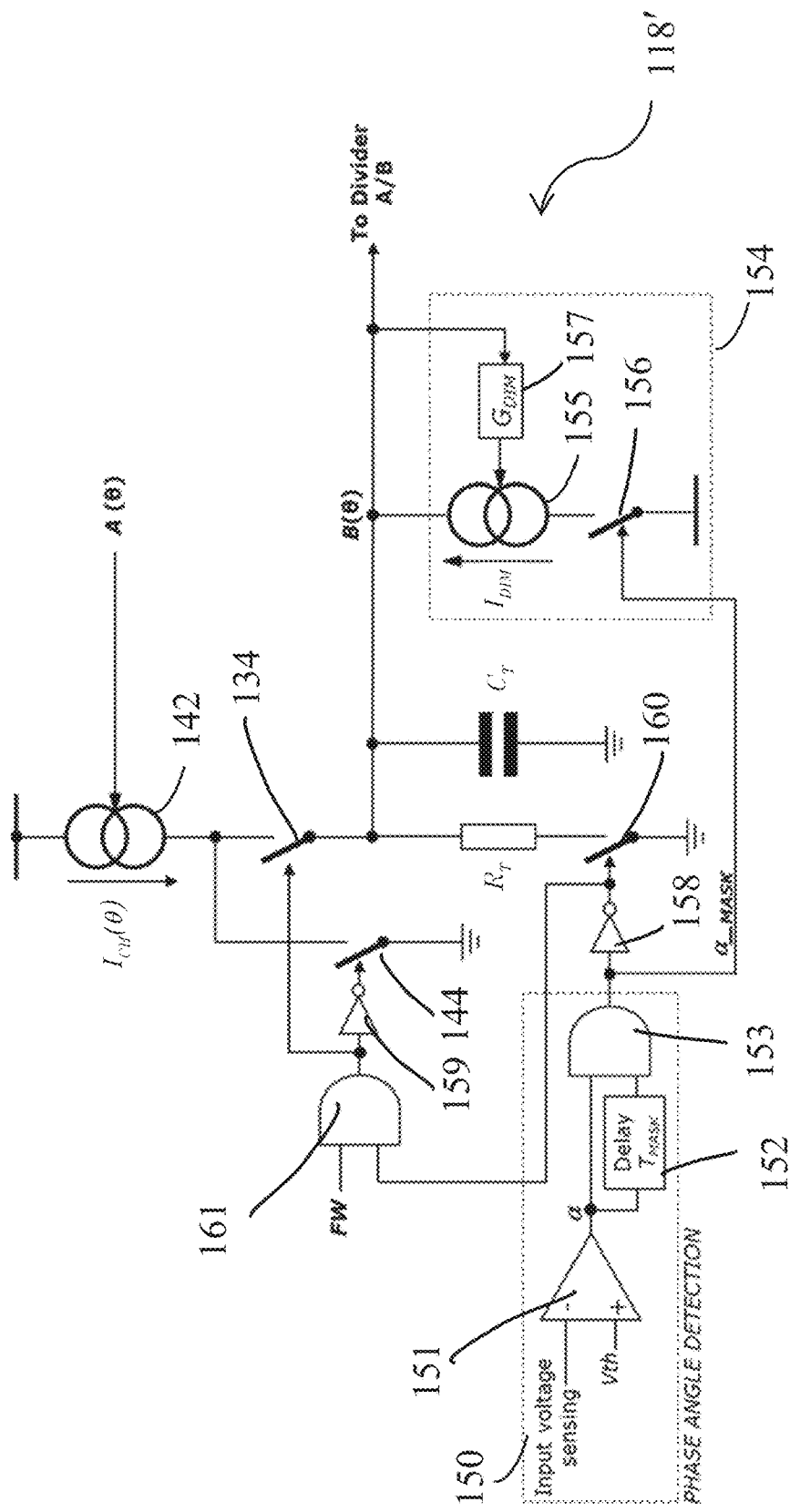
FIG. 9 shows an alternate voltage reference circuit with a dimming detector for the circuit of FIG. 7.

FIG. 9 is a reference voltage circuit 118' according to one embodiment of the present disclose and can be employed instead of the reference voltage circuit 118 of FIG. 7 when it is desired to obtain the dimming curve shown in FIG. 6. The reference voltage circuit 118' includes the switches 134, 144, second current generator 142, resistor $R_T$, and capacitor $C_T$ of the reference voltage generator 118 of FIG. 7. Unlike the reference voltage generator 118 of FIG. 7, the reference voltage circuit 118' includes a phase angle detector 150 having a comparator 151, a delay block 152, and an AND gate 153. The comparator 151 has an inverting input that receives a sensed input voltage from a dimmer, a non-inverting input that receives a voltage threshold $V_{th}$, and an output at which the comparator produces a signal α based on a comparison of the sensed input voltage with the voltage threshold $V_{th}$. The delay block 152 adds a masking time delay $T_{MASK}$ and the AND gate 153 outputs an $\alpha_{MASK}$ signal.

Figure 10:
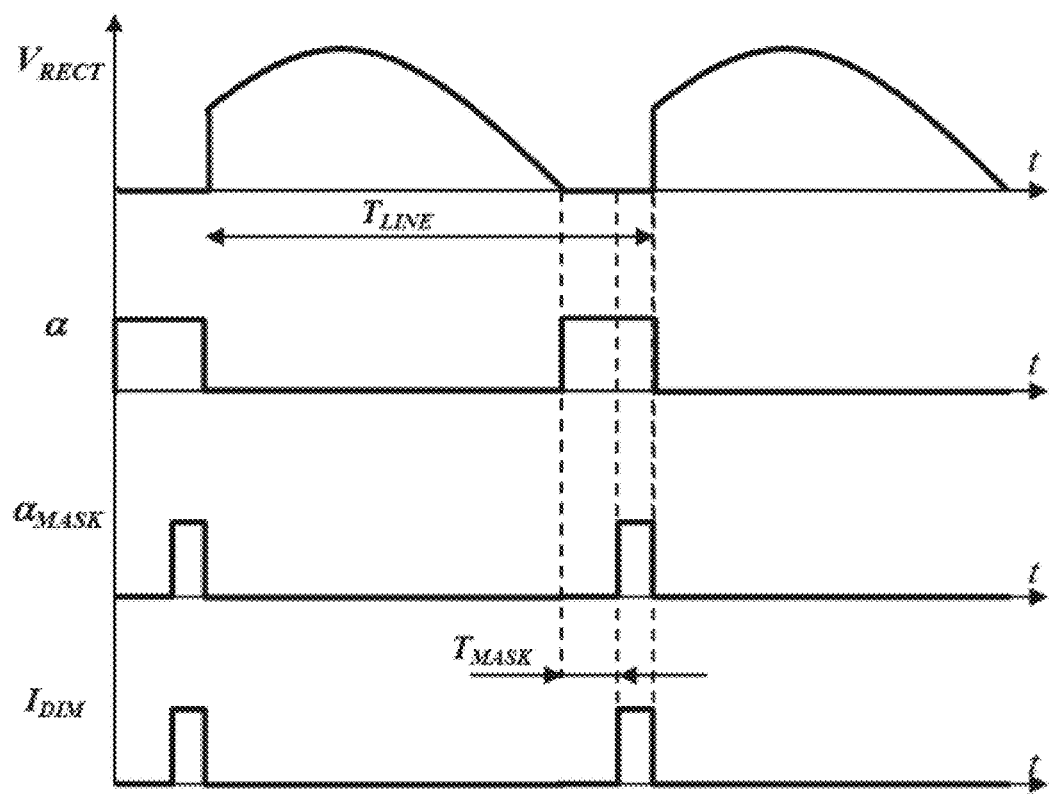
FIG. 10 shows the main waveforms of the circuit in FIG. 9.

The reference voltage circuit 118' also includes a dimming circuit 154 that includes a dimming current generator 155, a switch 156, and a gain block ($G_{DIM}$) 157. An extra current $I_{dim}$ is added on the $B(\theta)$ signal from dimming current generator 155. This current $I_{dim}$ is proportional to the signal $B(\theta)$ and, as shown in FIG. 10, is added only during a part of the dimmer off-time (basically only when $\alpha_{MASK}$ signal is high and closes the switch 156).

The reference voltage circuit 118' further includes inverters 158, 159, a switch 160, and another AND gate 161. The inverter 158 is connected between an output of the AND gate 153 and a control terminal of the switch 160, and thereby, controls the switch 160 based on an inverted version of the $C_{MASK}$ signal output by the phase angle detection circuit 150. The inverter 159 is connected between an output of the AND gate 161 and a control terminal of the switch 144. The AND gate 161 has first and second inputs connected respectively to the output of the ZCD block 130 that provides the FW signal and the output of the inverter 158 that provides the inverted version of the $C_{MASK}$ signal. The output of the AND gate 161 is also connected to a control terminal of the switch 134, so the AND gate 161 opens one of the switches 134, 144 while closing the other one of the switches 134, 144, and vice versa, depending on the FW signal output by the ZCD block 130 and on the inverted version of the $\alpha_{MASK}$ signal provided by the inverter 158.

The $I_{DIM}$ current generator 155 is added on the $C_T$ capacitor, increasing the $B(\theta)$ signal in function of the dimmer firing angle, resulting in a lower DC output current. In other words, the $I_{DIM}$ current generator 155 increases the equivalent $R_T$ discharging resistor based on the dimmer firing angle.

Considering the $C_T$ charge balance, it is possible to find the equivalent discharging resistor:

$$R_{Tequivalent} = R_T \left[ \frac{R_{DIM}}{R_{DIM}(1-\alpha_{MASK}) - R_T \alpha_{MASK}} \right]$$

The DC output current is therefore:

$$I_{out}[\alpha_{MASK}] = \frac{n K_D}{2 R_S G_M R_T} * \left[ \frac{R_{DIM}(1-\alpha_{MASK}) - R_T \alpha_{MASK}}{R_{DIM}} \right]$$

where $\alpha_{MASK} = \alpha - \frac{T_{MASK}}{T}$ and T is the line period.

The previous expression shows that the DC output current depends on the dimmer firing angle (1-α) with a relationship that has a high slope, and can be programmed through the $R_{DIM}$ resistor. Because of the $T_{MASK}$ delay time, the DC output current does not change until the dimmer off-time is higher than $T_{MASK}$.

Figure 11:
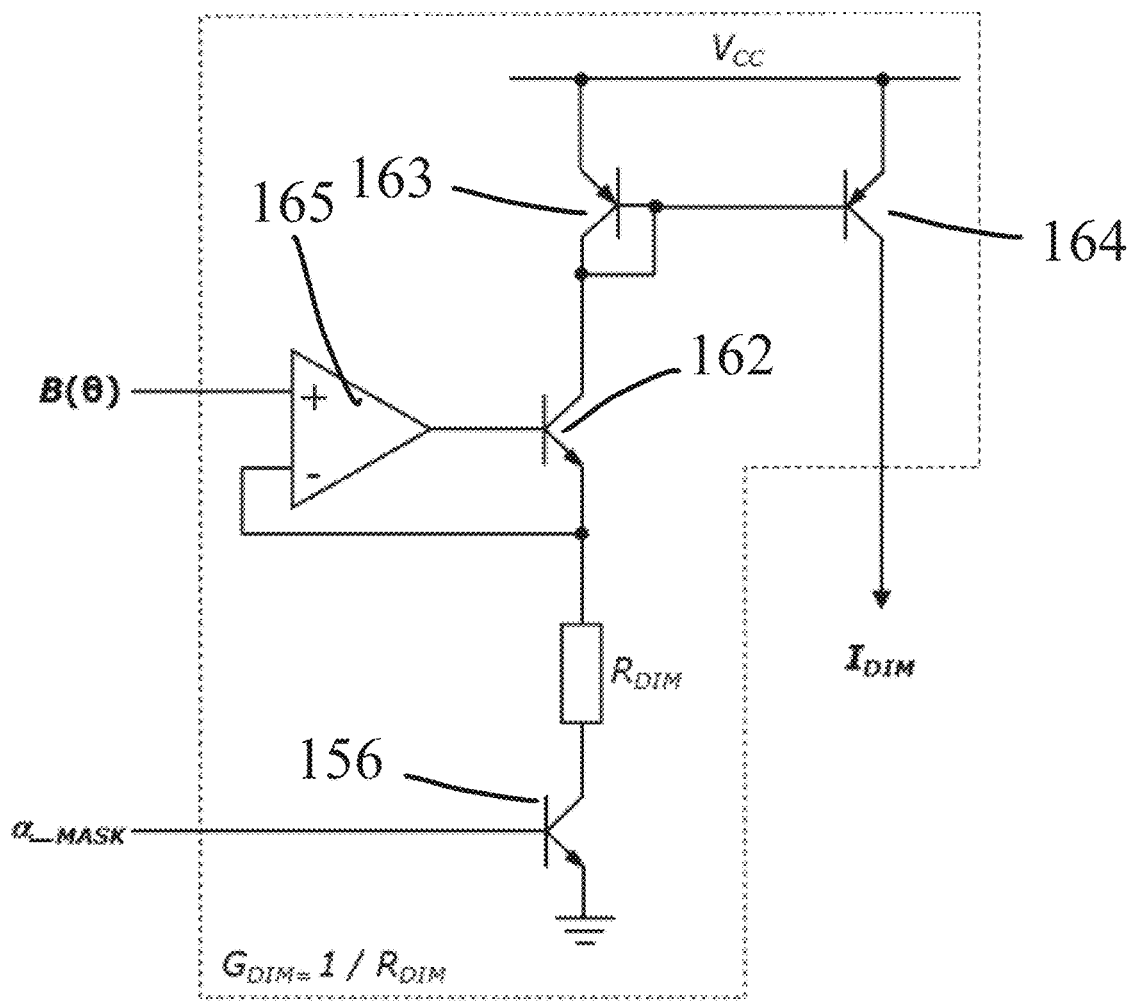
FIG. 11 shows a detailed dimming circuit for the circuit of the FIG. 9.

FIG. 11 shows the dimming circuit 154 of FIG. 9 according to one embodiment. The $I_{DIM}$ current generator 155 is implemented using a control transistor 162 and a current mirror that includes a diode-connected, bipolar first mirror transistor 163 and a bipolar second mirror transistor 164 having respective bases connected to each other and respective emitters connected to the supply terminal Vcc. The dimming circuit 154 also includes a resistor $R_{DIM}$ and the switch 156 connected in series with the control transistor 162 and the first mirror transistor 163 between the supply terminal Vcc and ground. The switch 156 is implemented as an NPN bipolar transistor having its collector connected to the resistor $R_{DIM}$, its emitter connected to ground, and its base connected to the output of the phase angle detector 150 to receive the $\alpha_{MASK}$ signal. The gain block 157 is implemented using an amplifier 165 having its non-inverting input connected to receive the B(θ) signal, its inverting input connected to a node between the emitter of the control transistor 162 and the resistor $R_{DIM}$, and its output connected to the base of the control transistor 162.

Figure 16:
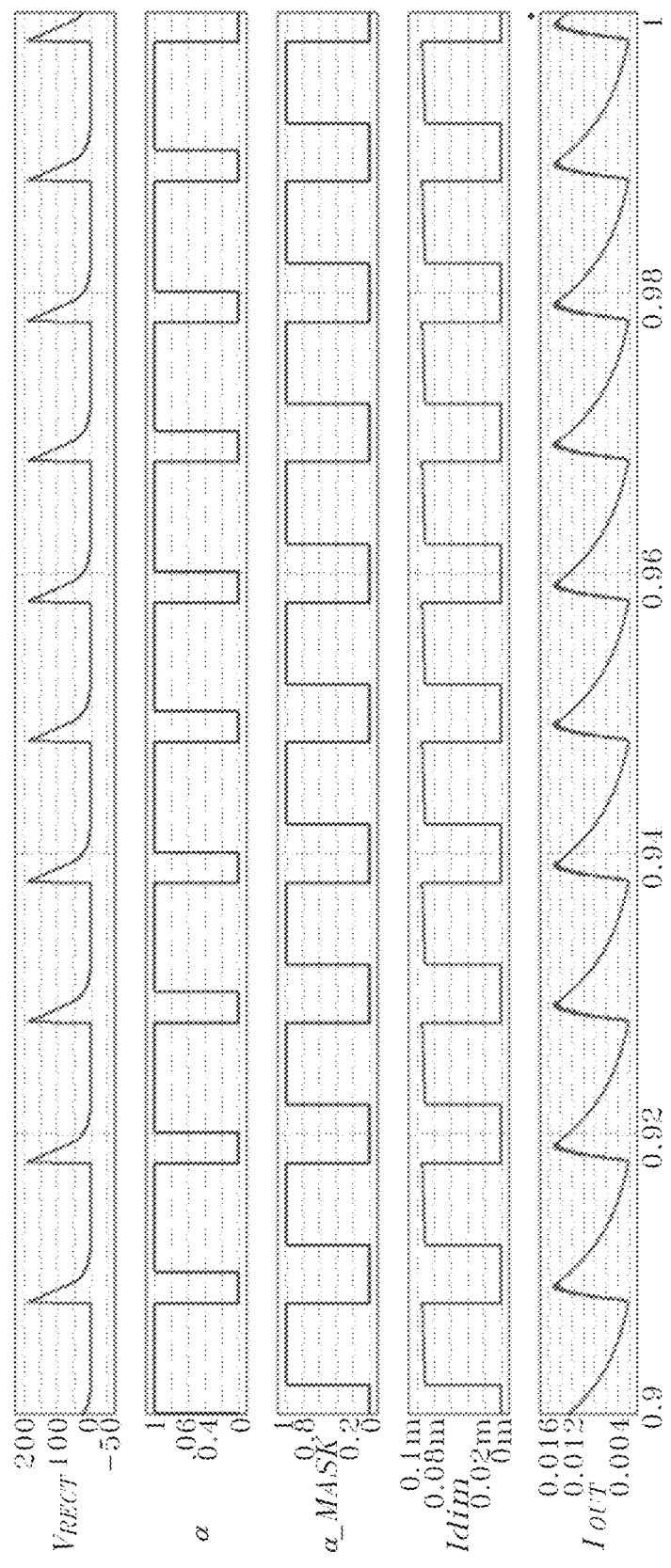
FIG. 16 shows the simulation results for the modified circuit in FIG. 9 at a firing angle $(1-\alpha)=0.2$.
Figure 17:
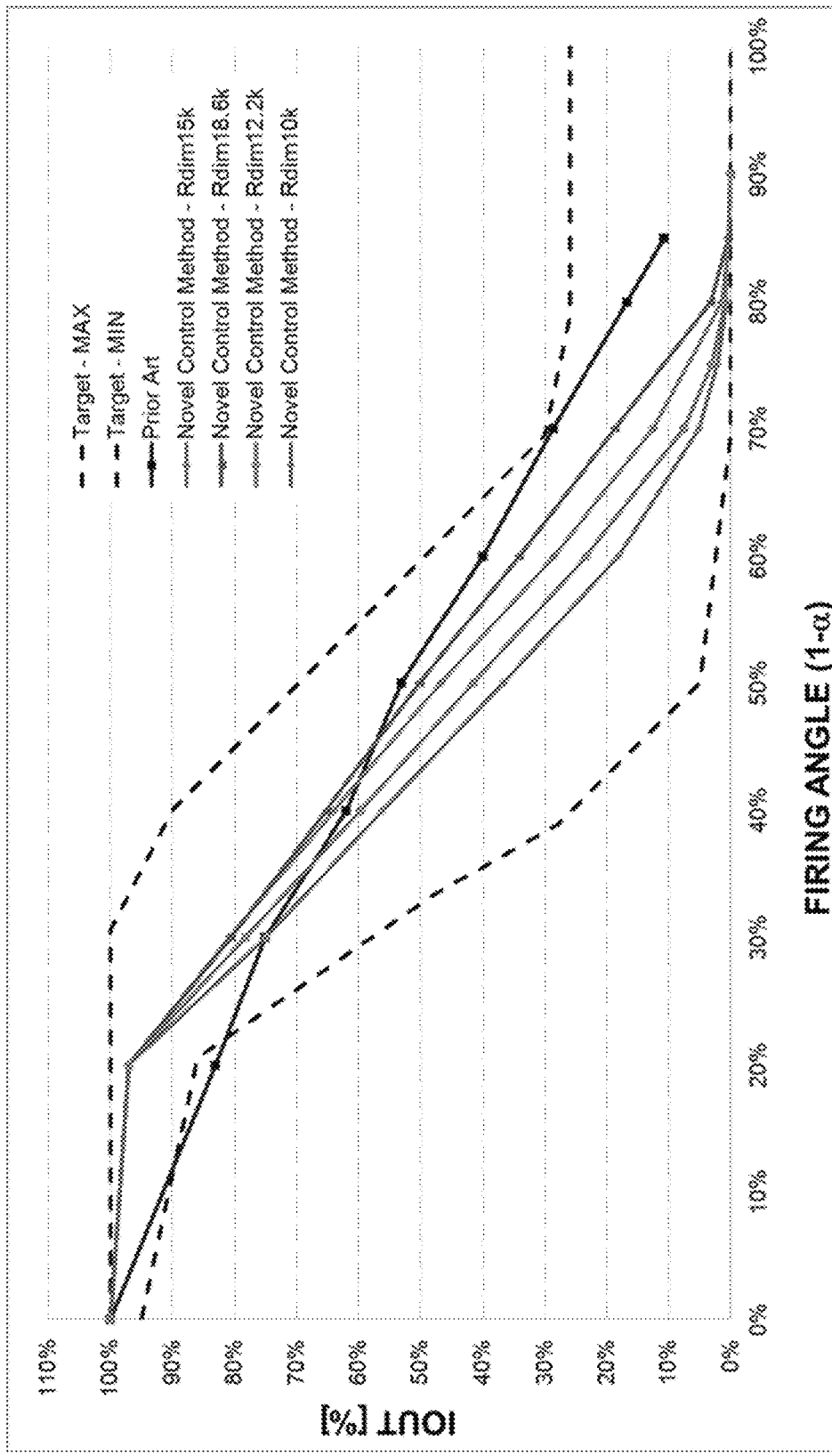
FIG. 17 shows the simulation results comparison between the prior art method and the present disclosure for dimming curves.

FIG. 16 shows simulation results of the circuit of FIG. 9 implemented in the QR converter of FIG. 7. In FIG. 17 is shown a comparison between the prior art converter 30 and the present disclosure converter 100 modified with the circuit of FIG. 9 in terms of dimming curves (output current versus dimmer firing angle).

Figure 18:
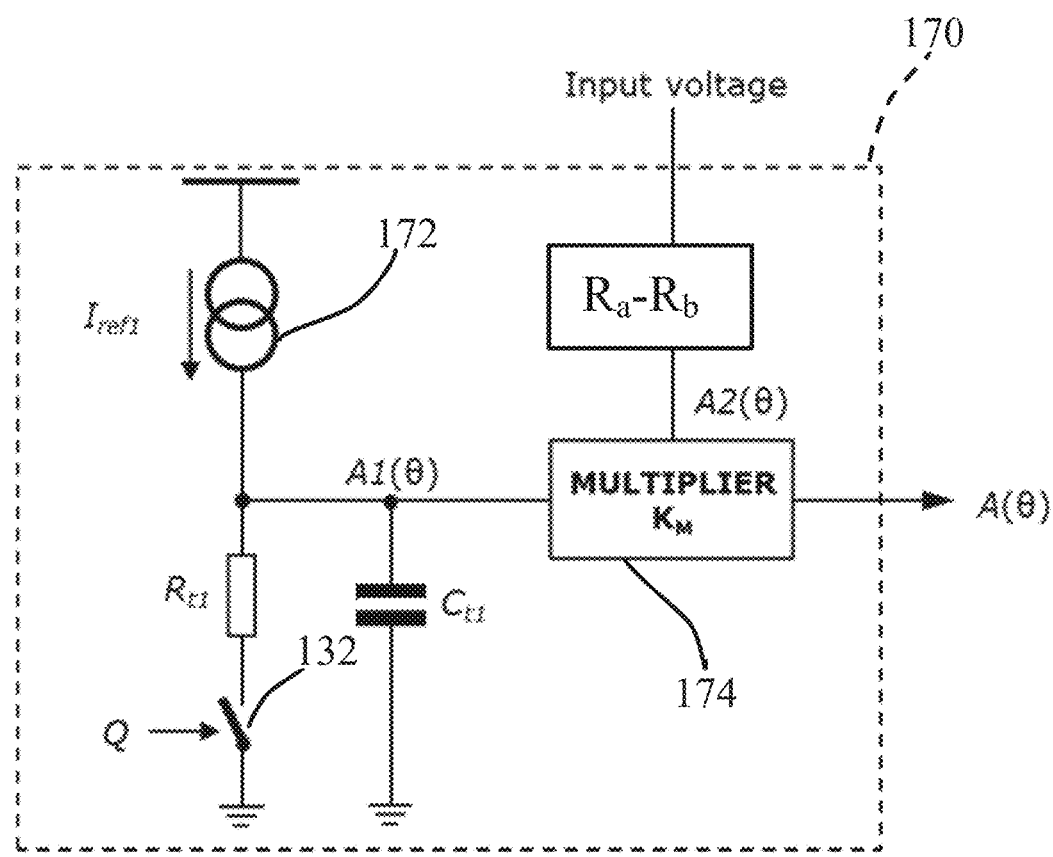
FIG. 18 shows an alternative embodiment to generate the signal $A(\theta)$.

Shown in FIG. 18 is an alternative implementation of a shaper circuit 170, which could be used in place of the shaper circuit 120 of FIG. 7 to generate the A(θ) signal. The shaper circuit 170 of FIG. 18 includes the resistor $R_{t1}$, capacitor $C_{t1}$, and switch 132 of the shaper circuit 120 of FIG. 7 and also includes the resistive voltage divider $R_a$–$R_b$ of FIG. 7. The shaper circuit 170 also has a current generator 172 connected between the supply terminal Vcc and the resistor $R_{t1}$ and configured to supply a current $I_{ref}$. A multiplier block 174 has a first input connected to a node between the output of the current generator 172 and resistor $R_{t1}$ and configured to receive a signal A1(θ), a second input connected to the mid-point of the voltage divider $R_a$–$R_b$ and configured to receive a signal A2(θ) from the voltage divider $R_a$–$R_b$, and an output configured to supply the A(θ) signal. Considering the $C_{t1}$ charge-balance, the A1(θ) voltage developed across the capacitor $C_{t1}$ is:

$$I_{ref1} T(\theta) = \frac{A1(\theta)}{R_{t1}} T_{ON}(\theta)$$

where $I_{ref1}$ is a constant current produced by the current generator 172.

Considering that A2(θ)=$K_p$ ($V_{PK}$ sin θ), the A(θ) signal results:

$$A(\theta) = K_M \, I_{ref1} \, R_{t1} \, K_P V_{PK} \, \sin\theta \frac{T(\theta)}{T_{ON}(\theta)}$$

Where $K_M$ is the gain of the multiplier block 174. Comparing the equation for the A(θ) signal produced by the shaper circuit 120 of FIG. 7 with the above equation for the A(θ) signal produced by the shaper circuit 170 of FIG. 18, the implementation shown in FIG. 18 is equivalent to the implementation shown in FIG. 7 if the multiplier gain, $K_M$, is:

$$K_M = \frac{g_{m1}}{I_{ref1}}$$

Figure 2:
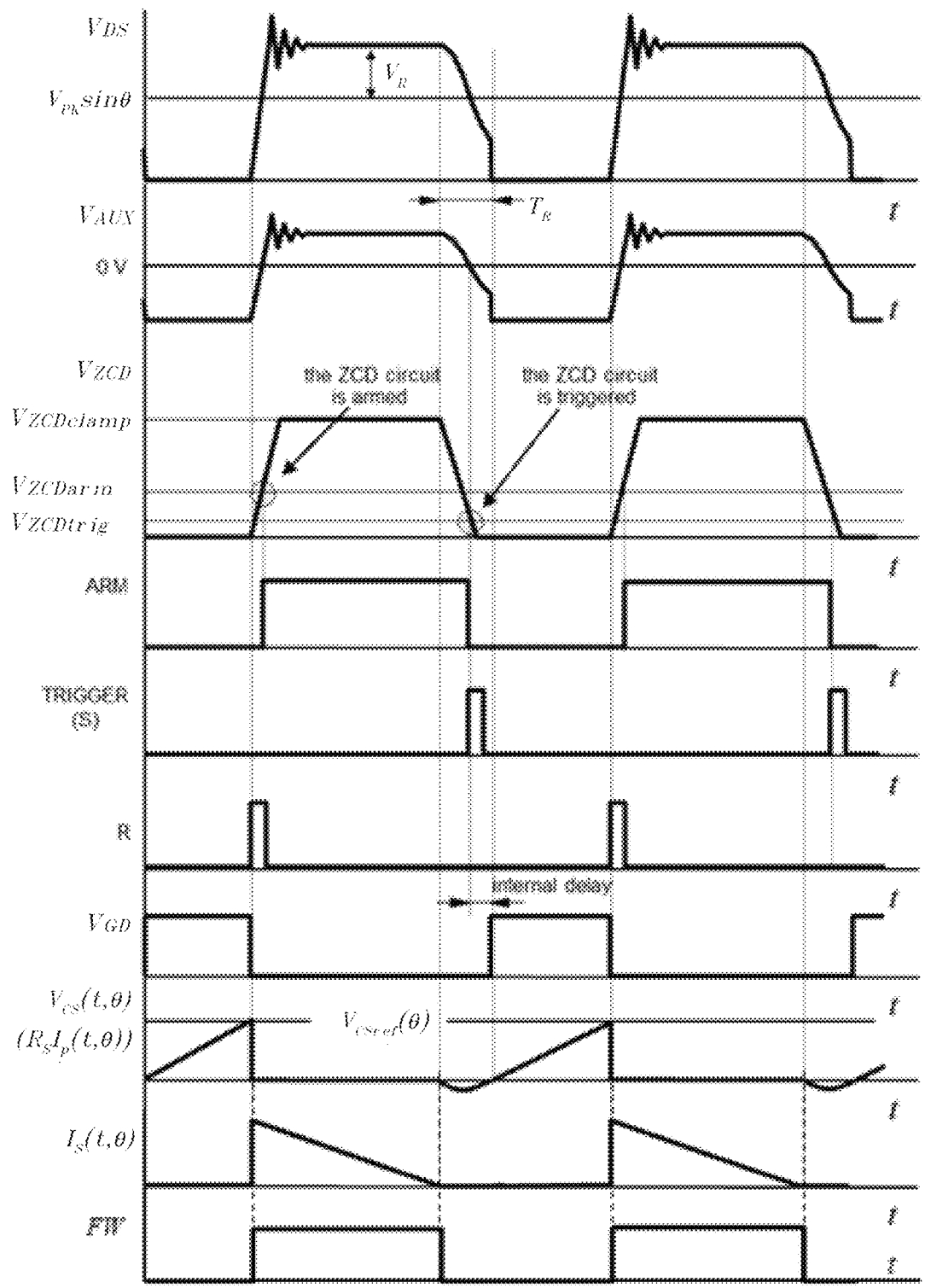
FIG. 2 shows the waveforms of the circuit in FIG. 1 during normal operation.
Figure 3:
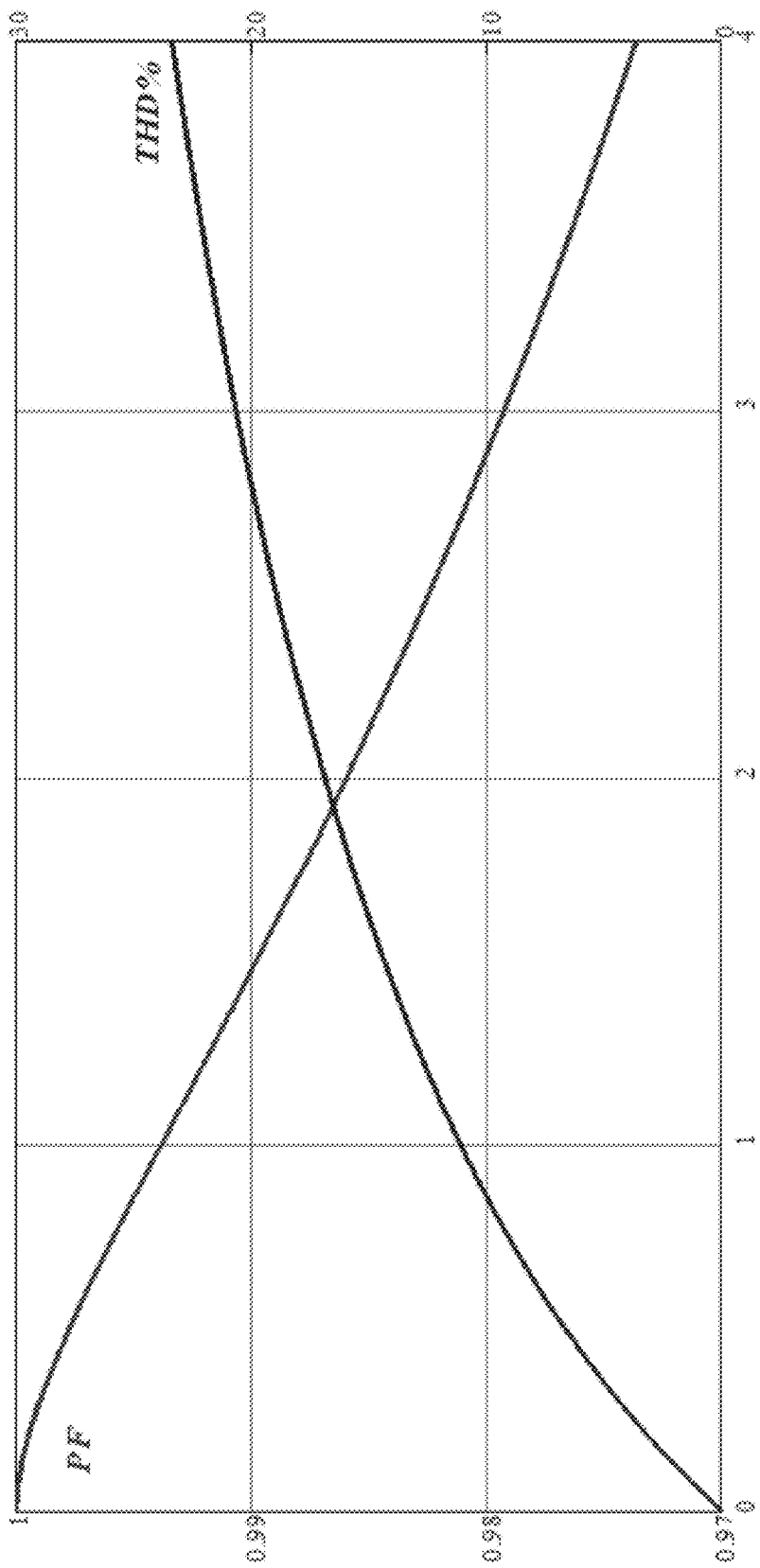
FIG. 3 shows the plot of the total harmonic distortion of the input current and the Power Factor obtained with the circuit of FIG. 1 for different values of $K_v$.
Figure 4:
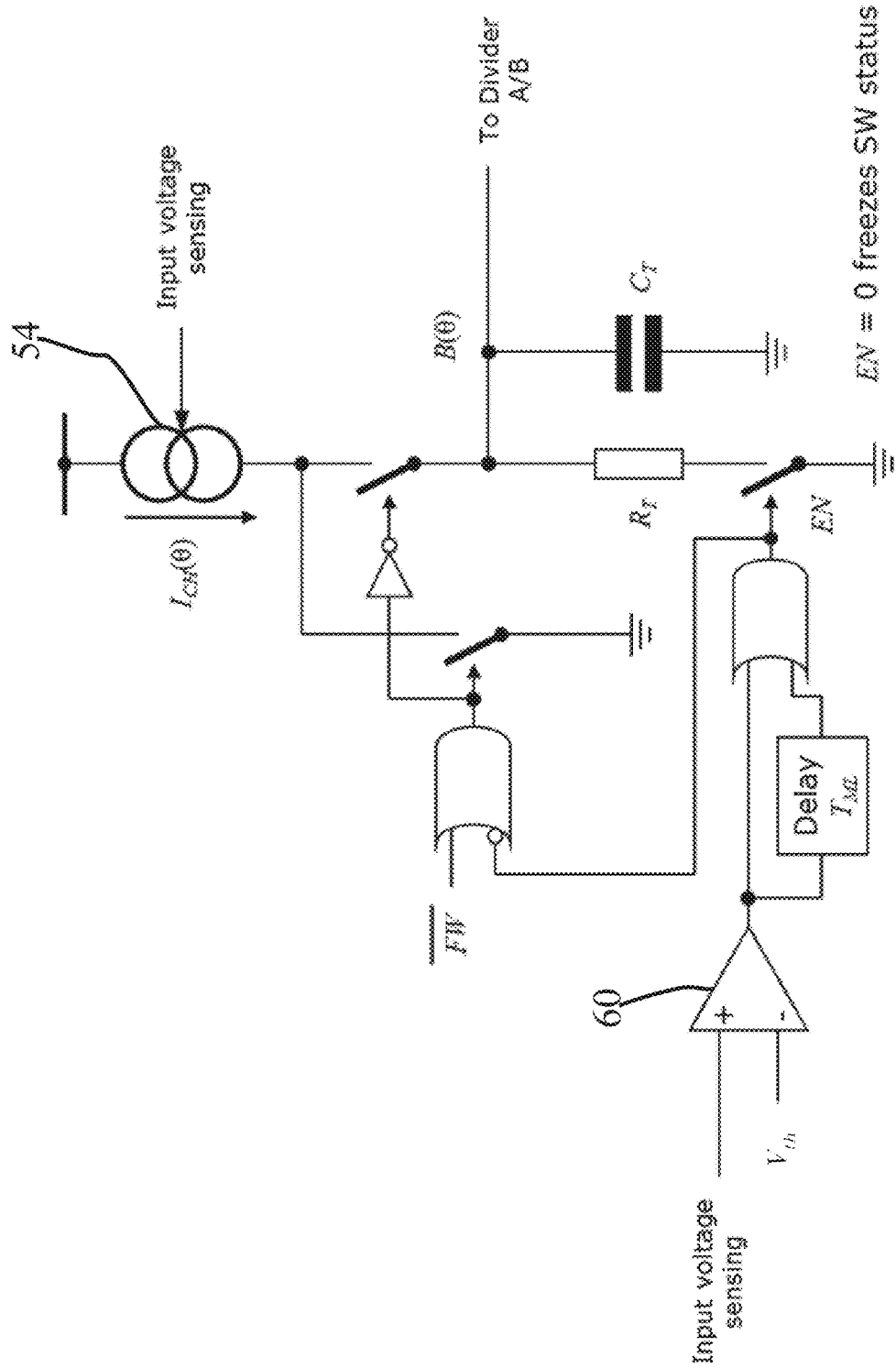
FIG. 4 shows the modification of the circuit in the dotted box in FIG. 1 to reduce the regulation setpoint depending on the dimmer firing angle $\alpha$, according to the prior art.
Figure 5:
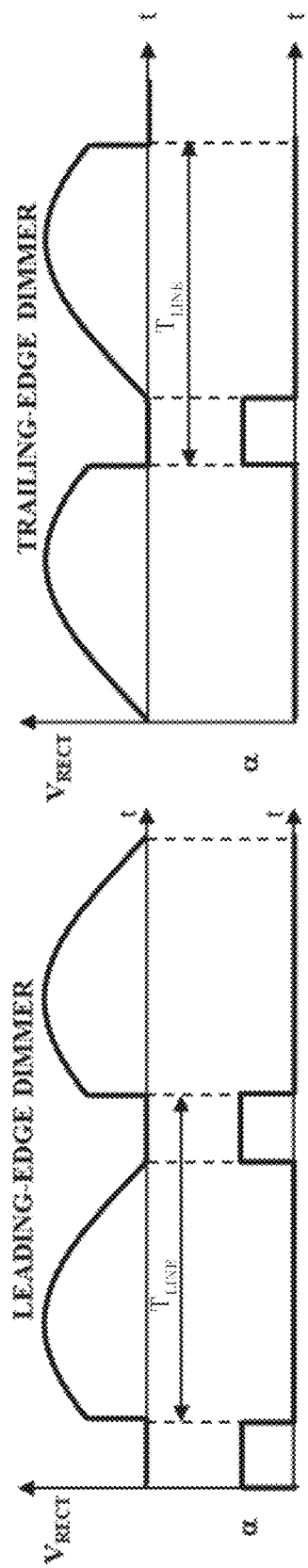
FIG. 5 shows the typical input voltage waveform with leading-edge and trailing-edge dimmers.
Figure 19:
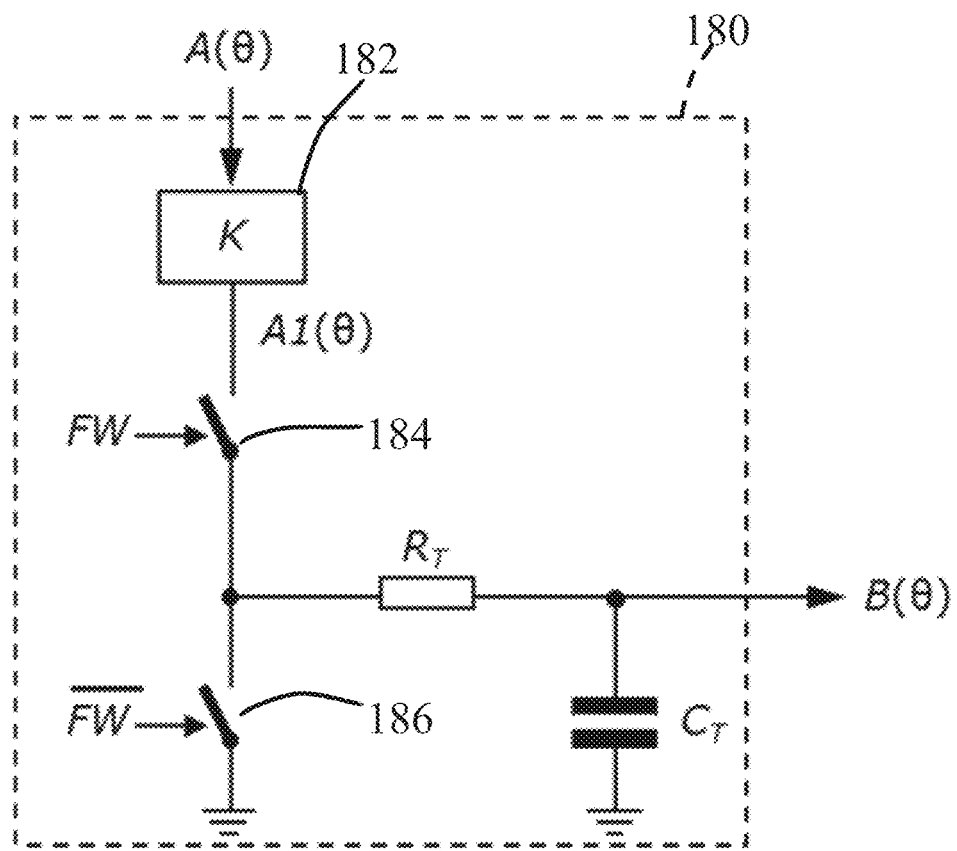
FIG. 19 shows an alternative embodiment to generate the signal $B(\theta)$.

Shown in FIG. 19 is alternative implementation of a bias circuit 180, which could be used in place of the bias circuit 118 of FIG. 7 to generate the B(θ) signal. The bias circuit 180 has an amplifier 182 configured to receive the A(θ) signal and produce a signal A1(θ). The amplifier 182 could be configured to receive the A(θ) signal from the shaper circuit 120 of FIG. 2, the shaper circuit 170 of FIG. 18, or a shaper circuit according to an alternate embodiment in view of the above discussion. Also, the amplifier 182 could be implemented by the controlled current generator 140, which produces the current $I_{ch1}(\theta)$ proportionally to the portion of the input voltage $V_{in}(\theta)$ at the midpoint of the voltage divider $R_a$–$R_b$, or an alternate amplifier could be employed. A first switch 184 is coupled between the amplifier 182 and the resistor $R_t$ and a configured to connect the amplifier 182 to the resistor $R_t$ based on the FW signal produced by the ZCD block 130. A second switch 186 is coupled between the first switch 184 and ground, and is configured to connect the resistor $R_t$ to ground based on the inverted signal $\overline{FW}$.

One can determine the B(θ) voltage by considering the following $C_T$ charge-balance:

$$\frac{A_1(\theta) - B(\theta)}{R_T} T_{FW}(\theta) = \frac{B(\theta)}{R_T} T(\theta).$$

Considering that $A_1(\theta)$=KA(θ), the B(θ) signal is:

$$B(\theta) = K \, A(\theta) \frac{T_{FW}(\theta)}{T(\theta)}$$

where K is the voltage gain of the amplifier 182.

Figure 20:
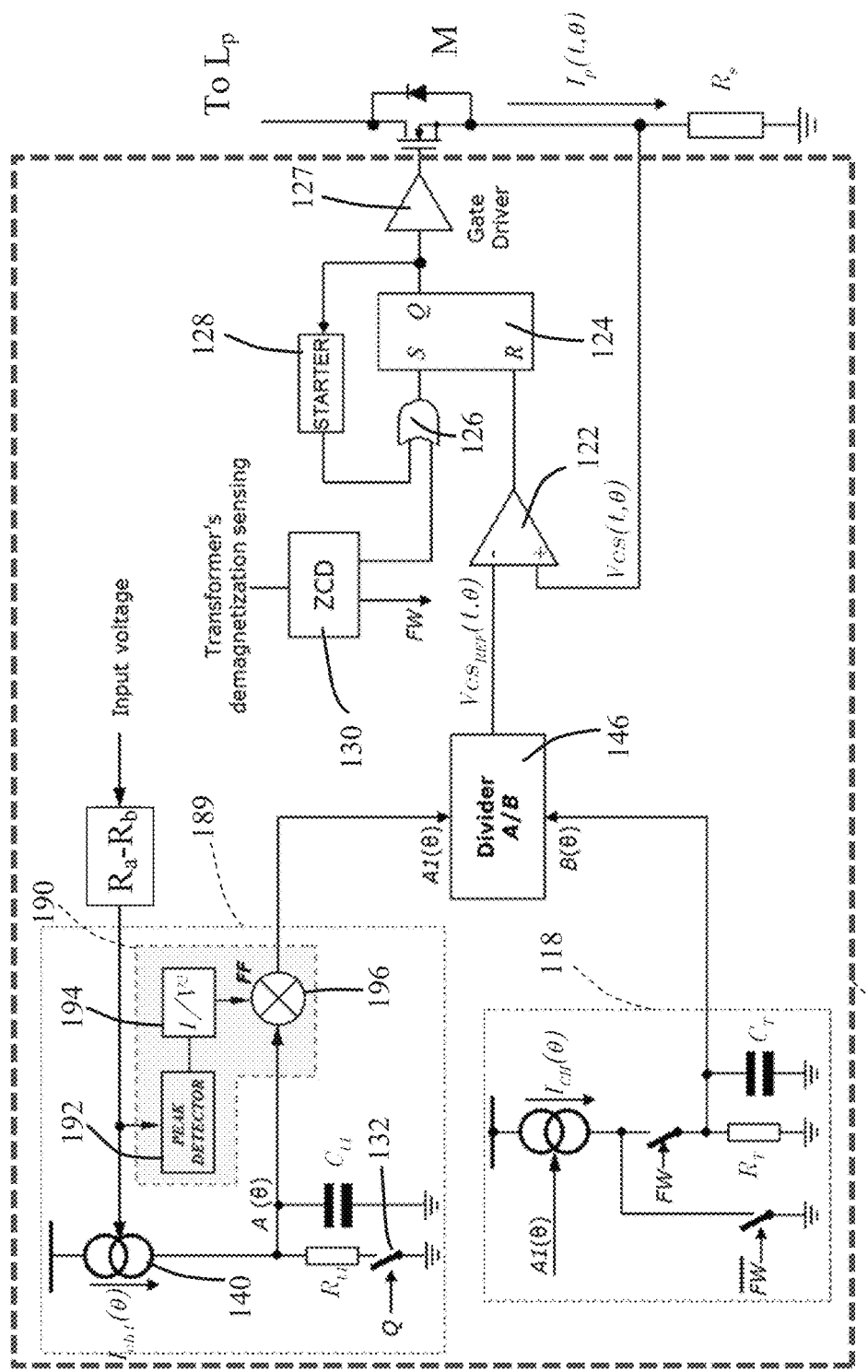
FIG. 20 shows an alternative embodiment of the circuit of FIG. 7 with a line voltage feed-forward.

In FIG. 20 is shown an alternative embodiment of a controller 188, which could be employed in place of the controller 102 of FIG. 7 to control the power switch M. The controller 188 is identical to the controller 102 of FIG. 7 except that the controller 188 includes a shaper circuit 189 instead of the shaper circuit 120. The shaper circuit 189 is configured to implement a line voltage feed-forward in order to eliminate the dependence of the signal B(θ) on the input voltage Vin. The shaper circuit 189 includes the same switch 132, current generator 140, resistor $R_{t1}$, and capacitor $C_{t1}$ as in the shaper circuit 120 of FIG. 7. In addition, the shaper circuit 189 includes a feed-forward circuit 190, which is composed of a peak detector 192, a quadratic voltage divider 194, and a multiplier 196. The peak detector 192 detects a voltage peak of the portion of the rectified input voltage received from the midpoint of the voltage divider $R_a$–$R_b$ and provides an output signal representative of that peak. The quadratic voltage divider 194 receives the output signal from the peak detector 192 and produces a feed-forward signal FF equal to:

$$FF = \frac{1}{(K_P V_{PK})^2}.$$

The multiplier 196 multiplies the feed-forward signal FF from the quadratic divider 194 to the signal A(θ) produced at the intermediate node between the current generator 140 and the capacitor $C_{t1}$ to produce a signal A1(θ):

$$A_1(\theta) = \frac{g_{m1}}{K_P} \frac{R_{t1}}{V_{PK}} \sin\theta \frac{T(\theta)}{T_{ON}(\theta)}.$$

The current $I_{CH}(\theta)$ provided by the current generator 142, used to generate the B(θ) signal, can be then expressed as:

$$I_{CH}(\theta) = G_M A1(\theta).$$

Now considering the $C_T$ charge-balance it is possible to find the voltage B(θ) developed across the capacitor $C_T$:

$$B(\theta) = G_M R_T \frac{g_{m1}}{K_P} \frac{R_{t1}}{V_{PK}} \sin\theta \frac{T_{FW}(\theta)}{T_{ON}(\theta)}.$$

Finally the DC component of the signal B(θ) is:

$$B_0 = \frac{G_M \; R_T \; g_{m1} \; R_{t1}}{2 \; K_P} \frac{1}{V_R}$$

The various embodiments described above can be combined to provide further embodiments. These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A control circuit, comprising:
   a reference voltage circuit configured to generate a reference voltage signal to control activation of a power transistor, the reference voltage circuit including:
      a shaper circuit configured to generate a first signal based on a reference current and a second signal based on an input voltage, the shaper circuit further configured to generate a third signal based on the first and second signals;
      a bias circuit configured to generate a fourth signal based on the third signal; and
      wherein the reference voltage circuit is further configured to generate the reference voltage signal based upon division of the third signal by the fourth signal; and
   a driver circuit coupled to the reference voltage circuit and configured to control activation of the power transistor based upon the reference voltage signal.

2. The control circuit of claim 1, wherein the shaper circuit is further configured to generate the third signal based on a multiplication of the first signal and the second signal.

3. The control circuit of claim 1, wherein the shaper circuit is further configured to charge a capacitive element with the reference current to generate the first signal.

4. The control circuit of claim 3, wherein the shaper circuit is further configured to discharge the capacitive element through a series-connected resistor and switch coupled in parallel with the capacitive element.

5. The control circuit of claim 1, wherein the bias circuit is further configured to amplify the third signal to generate a fifth signal and to supply the fifth signal to charge a capacitive element to generate the fourth signal.

6. The control circuit of claim 1, wherein the bias circuit is further configured to generate a charging current based on the third signal and to supply the charging current to charge a capacitive element to generate the fourth signal.

7. The control circuit of claim 1, wherein the driver circuit comprises a PWM comparator configured to receive the reference voltage signal and to drive an RS latch responsive to the reference voltage signal to control switching of the power transistor.

8. The control circuit of claim 1, wherein the input voltage is an instantaneous rectified line voltage.

9. The control circuit of claim 8, wherein the shaper circuit is further configured to divide the instantaneous rectified line voltage to generate the second signal.

10. A control circuit, comprising:
    a reference voltage circuit configured to generate a reference voltage signal to control activation of a power transistor, the reference voltage circuit including:
       a shaper circuit configured to generate a first signal based on a reference current and a second signal based on an input voltage, the shaper circuit further configured to generate a third signal based on the first and second signals;
       a bias circuit configured to generate a fourth signal based on the third signal, the bias circuit configured to amplify the third signal to generate a fifth signal and to supply the fifth signal to charge a capacitive element to generate the fourth signal; and
       wherein the reference voltage circuit is further configured to generate the reference voltage signal based upon division of the third signal by the fourth signal; and
    a driver circuit coupled to the reference voltage circuit and configured to control activation of the power transistor based upon the reference voltage signal.

11. The control circuit of claim 10, wherein the shaper circuit comprises:
    a reference current generator configured to generate a reference current;
    a capacitive element coupled to the reference current generator and configured to generate the first signal across the capacitive element responsive to the reference current;
    a voltage divider coupled to receive the input voltage an configured to generate the second signal; and
    a multiplier circuit coupled to the voltage divider and the capacitive element, the multiplier circuit configured to multiply the first signal and the second signal to generate the third signal.

12. The control circuit of claim 11, wherein the shaper circuit further comprises a series-connected resistor and switch coupled in parallel with the capacitive element.

13. The control circuit of claim 10, wherein the bias circuit further comprises:
    an amplifier coupled to receive the third signal and configured to amplify the third signal to generate on an output the fifth signal;
    a resistive element having a first node, and having a second node coupled to the capacitive element;
    a first switch coupled between the output of the amplifier and the first node of the resistive element; and
    a second switch coupled between the first node of the resistive element and a reference node.

14. The control circuit of claim 10, wherein the driver circuit comprises a PWM comparator configured to receive the reference voltage signal and to drive an RS latch responsive to the reference voltage signal to control switching of the power transistor.

15. The control circuit of claim 10, wherein the input voltage is an instantaneous rectified line voltage.

16. The control circuit of claim 15, wherein the shaper circuit is further configured to divide the instantaneous rectified line voltage to generate the second signal.

17. A power transistor control device, comprising:
    means for generating a first signal based on an input voltage;
    means for generating a second signal based on the first signal;
    means for dividing the first signal by the second signal to generate a reference voltage signal; and
    means for driving a power transistor based on the reference voltage signal.

18. The power transistor control device of claim 17, wherein the means for generating the first signal for generating a first current based on the input voltage.

19. The power transistor control device of claim 17, wherein the means for generating the first signal comprises means for generating a divided voltage signal based on the input voltage.

20. The power transistor control device of claim 17, wherein the means for generating the second signal based on the first signal comprises one of a means for generating a current based on the first signal and a means for multiplying the first signal by a gain.

* * * * *